(12) United States Patent  (10) Patent No.: US 12,487,699 B2
Ding et al.  (45) Date of Patent: Dec. 2, 2025

(54) METHOD FOR CALCULATING POSITION INFORMATION IN TOUCHSCREEN AND ELECTRONIC DEVICE

(71) Applicant: HONOR DEVICE CO., LTD., Shenzhen (CN)

(72) Inventors: Yue Ding, Shenzhen (CN); Guangxu Zhao, Shenzhen (CN); Juncheng Tian, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/014,607

(22) PCT Filed: Sep. 13, 2022

(86) PCT No.: PCT/CN2022/118546
§ 371 (c)(1),
(2) Date: Jan. 5, 2023

(87) PCT Pub. No.: WO2023/045806
PCT Pub. Date: Mar. 30, 2023

(65) Prior Publication Data
US 2024/0192800 A1  Jun. 13, 2024

(30) Foreign Application Priority Data
Sep. 24, 2021 (CN) .......................... 202111124509.3

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
None
See application file for complete search history.

(56) References Cited

U.S. PATENT DOCUMENTS

| 11,093,078 B1* | 8/2021 | Bharathan ............... G06F 3/044 |
| 11,163,969 B2 | 11/2021 | Wang et al. |
| 2008/0062140 A1* | 3/2008 | Hotelling ............... G06F 3/0444 345/173 |
| 2008/0117177 A1 | 5/2008 | Ko et al. |

(Continued)

FOREIGN PATENT DOCUMENTS

| CN | 101192257 A | 6/2008 |
| CN | 101625553 A | 1/2010 |

(Continued)

*Primary Examiner* — Christopher R Lamb
(74) *Attorney, Agent, or Firm* — WOMBLE BOND DICKINSON (US) LLP

(57) ABSTRACT

This application provides a method for calculating position information in a touchscreen and an electronic device. In the method for calculating position information in a touchscreen, because a touch chip transmits, by using a high-speed serial bus, source data generated by a trigger operation, first duration t1 for the touch chip to transmit the source data generated by the trigger operation can be shorter. Because position information of the trigger operation in the touchscreen is calculated in a CPU, second duration t2 for the CPU to calculate coordinates of a position at which a user triggers the touchscreen can also be shorter.

20 Claims, 16 Drawing Sheets

(56) References Cited

U.S. PATENT DOCUMENTS

| | | | | |
|---|---|---|---|---|
| 2008/0158177 | A1* | 7/2008 | Wilson | G06F 3/04166 345/173 |
| 2010/0265211 | A1 | 10/2010 | Oishi et al. | |
| 2012/0054379 | A1* | 3/2012 | Leung | G06F 1/3262 710/23 |
| 2013/0027346 | A1* | 1/2013 | Yarosh | G06F 3/04166 345/174 |
| 2013/0328807 | A1* | 12/2013 | Matsumoto | G02F 1/1368 345/173 |
| 2014/0041026 | A1* | 2/2014 | Scott | G06F 21/53 726/22 |
| 2014/0160041 | A1* | 6/2014 | Kim | G06F 3/04184 345/173 |
| 2014/0160085 | A1* | 6/2014 | Rabii | G06F 3/0418 345/178 |
| 2015/0089261 | A1* | 3/2015 | Segawa | G06F 1/324 713/323 |
| 2017/0169537 | A1* | 6/2017 | Nemiroff | G06F 3/0416 |
| 2017/0315652 | A1 | 11/2017 | Pourbigharaz | |
| 2018/0011593 | A1 | 1/2018 | Chang et al. | |
| 2018/0107292 | A1* | 4/2018 | Jang | G06F 3/04166 |
| 2018/0267661 | A1 | 9/2018 | Suzuki | |

FOREIGN PATENT DOCUMENTS

| | | |
|---|---|---|
| CN | 101995987 A | 3/2011 |
| CN | 204406369 U | 6/2015 |
| CN | 107636596 A | 1/2018 |
| CN | 109992314 A | 7/2019 |
| CN | 111061445 A | 4/2020 |
| CN | 105593868 B | 8/2020 |
| CN | 112099666 A | 12/2020 |
| CN | 112860105 A | 5/2021 |
| CN | 112965653 A | 6/2021 |
| JP | 2010108373 A | 5/2010 |
| WO | 2021082564 A1 | 5/2021 |
| WO | 2021114690 A1 | 6/2021 |

* cited by examiner

METHOD FOR CALCULATING POSITION INFORMATION IN TOUCHSCREEN AND ELECTRONIC DEVICE

CROSS-REFERENCE TO RELATED APPLICATIONS

This application is a national stage of International Application No. PCT/CN2022/118546, filed on Sep. 13, 2022, which claims priority to Chinese Patent Application No. 202111124509.3, filed on Sep. 24, 2021. The disclosures of both of the aforementioned applications are hereby incorporated by reference in their entireties.

TECHNICAL FIELD

This application relates to the field of terminal technologies, and in particular, to a method for calculating position information in a touchscreen and an electronic device.

BACKGROUND

Currently, electronic devices have become a part of people's work and life. An electronic device usually includes a touchscreen. The electronic device can receive a trigger operation performed on the touchscreen by a user, and perform a corresponding function based on a triggered position.

The electronic device can usually collect source data of the touchscreen by using a touch chip. When the touchscreen is triggered, a micro control unit MCU on the touch chip can calculate, based on the collected source data, coordinates of a position at which the user triggers the touchscreen. Then, a central processing unit CPU can read the calculated coordinates by using an I2C bus. In this way, the CPU performs a function corresponding to the coordinates.

It can be learned that the coordinates of the position at which the user triggers the touchscreen are calculated in the MCU in the touch chip, but a computing speed is low because a clock rate of the MCU is 200 MHz~400 MHz. As a result, there is a high delay when the electronic device performs the function corresponding to the trigger operation based on the trigger operation performed by the user.

SUMMARY

This application provides a method for calculating position information in a touchscreen and an electronic device, to shorten a delay of the electronic device in performing a function corresponding to a trigger operation based on the trigger operation performed by a user.

According to a first aspect, this application provides a method for calculating position information in a touchscreen, which is applied to an electronic device. The electronic device includes a touchscreen, a touch chip, and a central processing unit CPU. The method according to this application includes: The touch chip samples source data generated by a trigger operation in the touchscreen, when the touchscreen receives the trigger operation. The touch chip transmits the source data to the CPU by using a high-speed serial bus, where the source data is used to indicate capacitance of the touch chip. The CPU calculates position information of the trigger operation in the touchscreen based on the source data.

In the method for calculating position information in a touchscreen according to this embodiment of this application, because the touch chip transmits, by using the high-speed serial bus, the source data generated by the trigger operation, and the high-speed serial bus has a higher transfer rate, first duration t1 for the touch chip to transmit the source data generated by the trigger operation can be shorter. Further, because the position information of the trigger operation in the touchscreen is calculated in the CPU, and a computing speed of the CPU is also higher due to a higher clock rate of the CPU, second duration t2 for the CPU to calculate coordinates of a position at which the user triggers the touchscreen can also be shorter. In this way, a sum of the first duration t1 and the second duration t2 can be smaller.

In this way, a delay t3 from a time when the touchscreen of the electronic device receives the trigger operation to a time when a third-party application performs a function corresponding to a control at the position information includes the first duration t1 for the touch chip to transmit the source data to the CPU and the second duration t2 for the CPU to calculate the position information of the trigger operation in the touchscreen. In this way, when the sum of the first duration t1 and the second duration t2 is smaller, the delay t3 from the time when the touchscreen of the electronic device receives the trigger operation to the time when the third-party application performs the function corresponding to the control at the position information is shortened. In this way, user experience can be improved.

In a possible implementation, the electronic device further includes a bus controller and a direct memory access DMA, and that the touch chip transmits the source data to the CPU by using a high-speed serial bus includes: The touch chip controls the CPU to wake up a data transfer thread. The CPU controls the bus controller to add a DMA flag. The flag is used to indicate that the DMA is occupied by the bus controller. The bus controller copies the source data from the touch chip to the DMA by using the high-speed serial bus. The bus controller controls the CPU to extract the source data from the DMA.

In a possible implementation, a priority of instructing to wake up the preset data transfer thread preset in the CPU is higher than that of another to-be-processed thread in the CPU, and a priority of a thread that is preset in the bus controller and that is used to instruct to occupy the DMA is higher than that of another to-be-processed thread in the bus controller.

In this way, the first duration t1 for the touch chip to transmit the source data generated by the trigger operation can be further shortened. The delay t3 from the time when the touchscreen of the electronic device receives the trigger operation to the time when the third-party application performs the function corresponding to the control at the position information is shortened.

In a possible implementation, after the CPU controls the bus controller to add a DMA flag, the method according to this application further includes: controlling the data transfer thread to start sleeping.

That the bus controller controls the CPU to extract the source data from the DMA includes: The bus controller controls the CPU to wake up the data transfer thread: and extracts the source data from the DMA after the CPU wakes up the data transfer thread.

In this way, the CPU may also process another to-be-processed thread during sleep of the data transfer thread.

In a possible implementation, that the touch chip samples source data generated by a trigger operation in the touchscreen includes: The touch chip transmits a sampling pulse sequence to the touchscreen based on a preset sampling period, to sample the source data generated by the trigger operation in the touchscreen. Transmission, by the touch chip, of the source data sampled by an $N^{th}$ group of sampling pulse sequence and transmission of a $(N+1)^{th}$ group of sampling pulse sequence by the touch chip are simultaneously performed, where N is an integer greater than 1, and the sampling period is less than a preset duration threshold.

It is assumed that fourth duration for which the pulse sequence lasts is t4, and fifth duration between every two groups of sampling pulse sequences is t5. The fifth duration t5 is equal to a difference between a sampling period T1 and the fourth duration t4 for which the pulse sequence lasts. It can be understood that the fifth duration t5 can be shorter when the preset sampling period is less than the preset duration threshold and the fourth duration t4 for which the pulse sequence lasts is unchanged. In this way, even if a time when the user performs the trigger operation on the touchscreen is between two groups of sampling pulse sequences, the delay from the sampling of the $N^{th}$ group of sampling pulse sequence to the trigger operation on the touchscreen by the user is still shortened. Because the fifth duration t5 is a part of the foregoing duration t3, when the fifth duration t5 is shorter, the delay t3 from the time when the touchscreen receives the trigger operation to the time when the third-party application performs the function corresponding to the control at the position information can be further shortened.

In a possible implementation, the preset duration threshold is less than or equal to 2.5 ms.

In a possible implementation, that the touch chip samples source data generated by a trigger operation in the touchscreen includes: The touch chip transmits a sampling pulse sequence to the touchscreen based on a preset sampling period, to sample the source data generated by the trigger operation in the touchscreen. A quantity of sampling pulses in the sampling pulse sequence is less than 30.

When the quantity of sampling pulses in the sampling pulse sequence is less than 30, the fourth duration t4 for which the pulse sequence lasts can be shorter (that is, the sampling duration is further shortened). When the fourth duration t4 is shorter, the delay t3 from the time when the touchscreen receives the trigger operation to the time when the third-party application performs the function corresponding to the control at the position information can be further shortened (that is, the sampling delay is shortened).

In a possible implementation, a sampling voltage of the sampling pulses is greater than 3 V.

In this way, reliability of the sampled source data can be improved.

In a possible implementation, the method according to this application further includes: The CPU filters the obtained source data by using a filtering algorithm.

In this way, reliability of the source data can be improved.

In a possible implementation, the high-speed serial bus is a serial peripheral interface SPI bus.

When the SPI bus is in a high-speed mode, the data transfer rate can reach 20 Mbps. It can be learned that SPI bus has a higher data transfer rate. Then, the first duration t1 for the CPU to read the source data from the touch chip or the touch chip to write the source data to the CPU can be shorter.

In a possible implementation, after the CPU calculates position information of the trigger operation in the touchscreen based on the source data, the method according to this application further includes: The CPU transparently transmits the position information to a third-party application, so that the third-party application performs a function corresponding to a control at the position information.

According to a second aspect, this application further provides an electronic device, including a touchscreen, a touch chip, and a central processing unit CPU, where when the touchscreen receives a trigger operation, the electronic device performs the method for calculating position information in a touchscreen according to the first aspect of this application.

It should be understood that the technical solution of the second aspect of this application correspond to the technical solution of the first aspect of this application, and beneficial effects achieved by the aspects and corresponding feasible implementations are similar. Details are not described again.

DESCRIPTION OF EMBODIMENTS

To clearly describe the technical solutions in embodiments of this application, in embodiments of this application, words such as "first" and "second" are used to distinguish between same items or similar items with basically the same functions and effects. For example, a first value and a second value are merely used to distinguish between different values, but not limit a sequence thereof. A person skilled in the art may understand that words such as "first" and "second" do not limit a quantity or an execution order, and the words such as "first" and "second" do not necessarily indicate a difference.

It should be noted that, in this application, words such as "for example" or "such as" are used to indicate an example, illustration, or description. Any embodiment or design solution described as "for example" or "such as" in this application should not be construed as being preferred or advantageous over other embodiments or design solutions. To be precise, the use of the words such as "example" or "for example" is intended to present a related concept in a specific manner.

In this application, "at least one" means one or more, and "a plurality of" means two or more. "And/or" describes an association relationship between associated objects, and indicates that three relationships may exist. For example, A and/or B may indicate the following: Only A exists, both A and B exist, and only B exists, where A and/or B may indicate a singular or plural form. The character "/" generally indicates an "or" relationship between associated objects. "At least one of the following" or a similar expression thereof indicates any combination of these items, including a single item or any combination of a plurality of items. For example, at least one of a, b, or c may represent a, b, c, a and b, a and c, b and c, or a, b, and c, where a, b, and c may be singular or plural.

Currently, electronic devices have become a part of people's work and life. An electronic device usually includes a touchscreen. The electronic device can receive a trigger operation performed on the touchscreen by a user, and perform a corresponding function based on a triggered position. It can be understood that a delay of the electronic device in performing the function corresponding to the trigger operation based on the trigger operation performed by the user includes first duration t1 for a touch chip to transmit data to a CPU and second duration t2 for calculating position information.

Figure 1A:
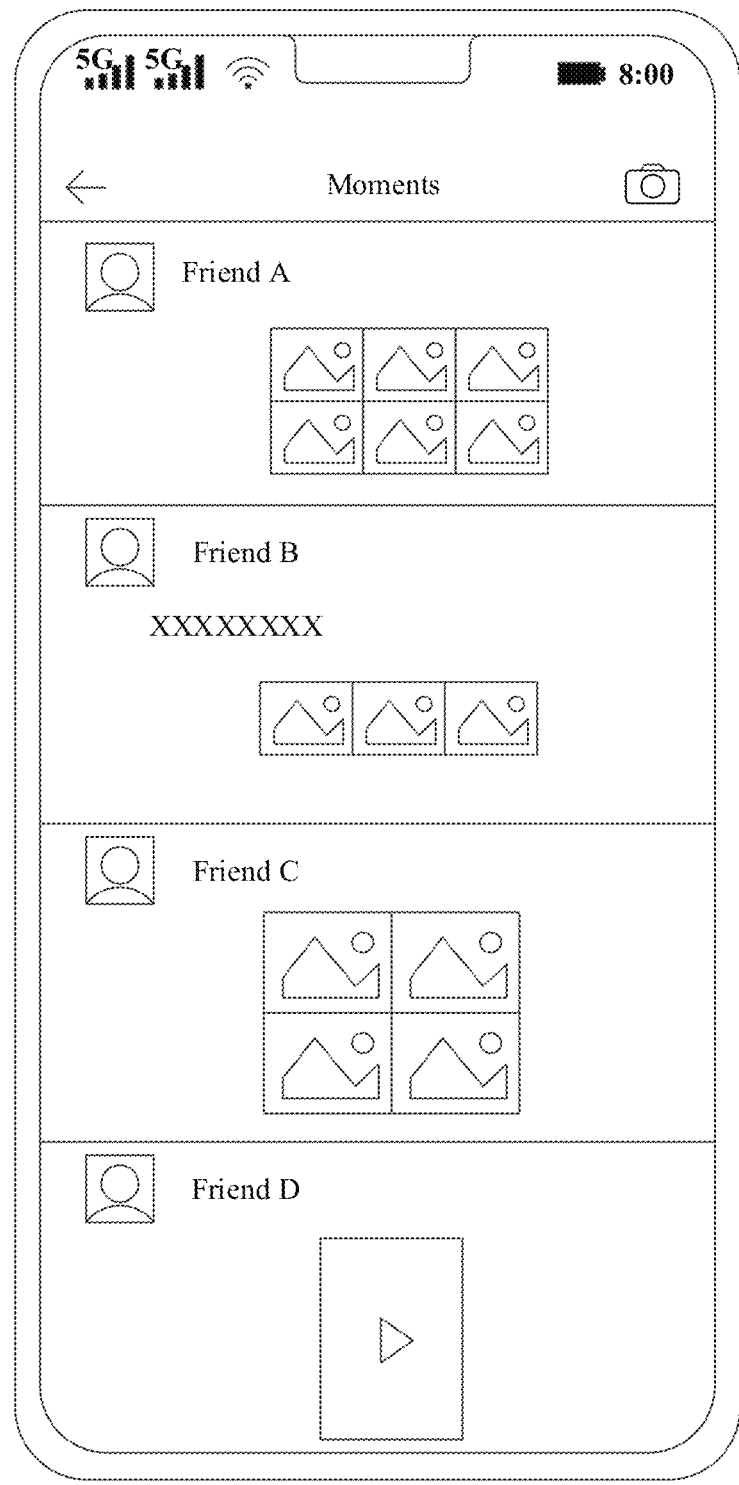
FIG. 1(a)-FIG. 1(c) are a schematic diagram of an interface when a video control 401 is triggered to play a video, after a WeChat® interface slides up.
Figure 1B:
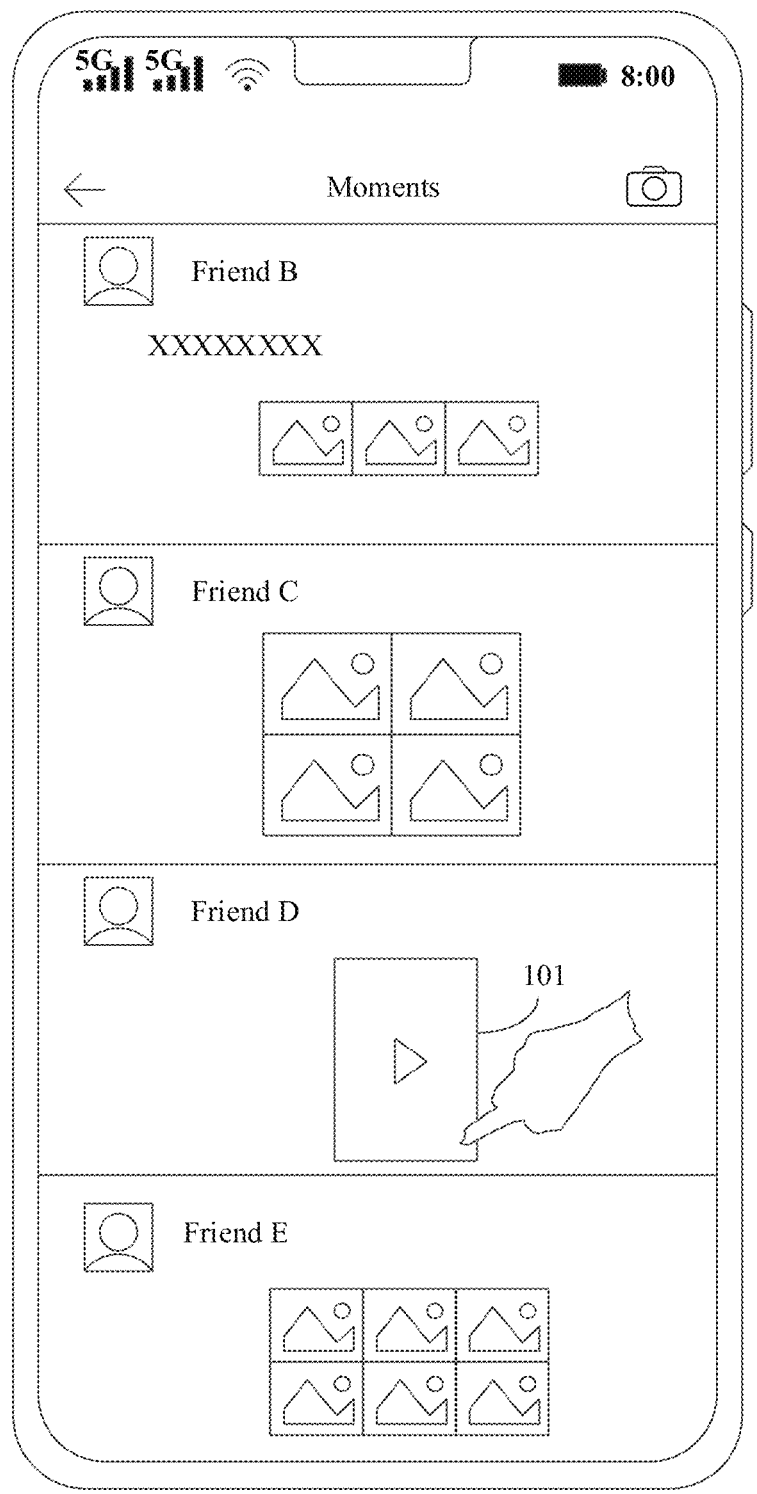
Figure 1C:
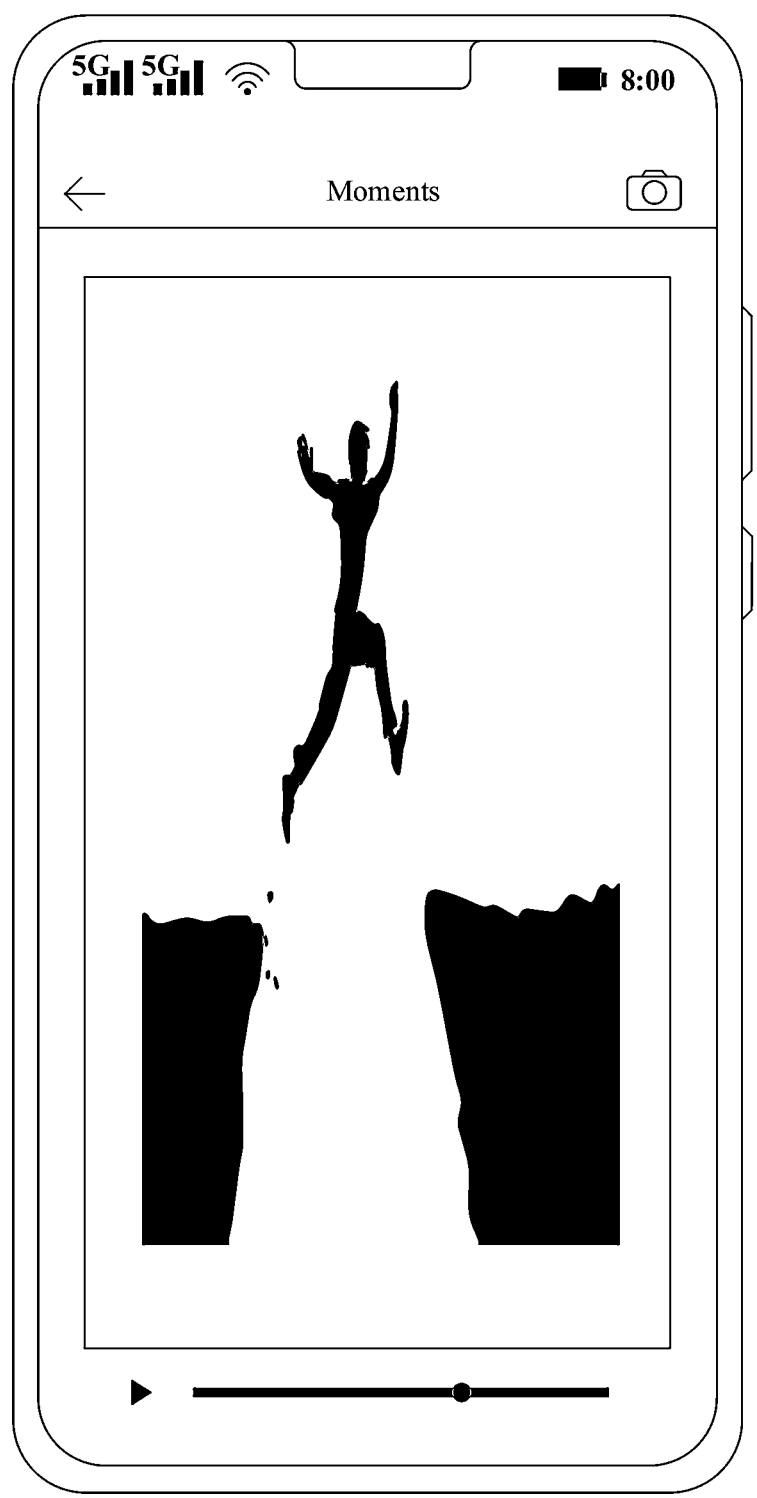
Figure 2:
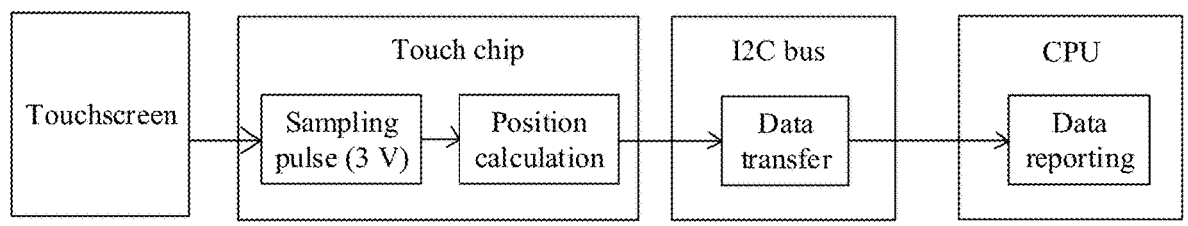
FIG. 2 is a schematic diagram of an architecture in which a function corresponding to a control at position information is performed when a touchscreen of an electronic device is triggered.

For example, when the touchscreen of the electronic device receives a touch operation of sliding up by the user on a WeChat® interface shown in a in FIG. 1, content displayed on the interface of the touchscreen changes to an interface shown in b in FIG. 1. When the user triggers a video control 401 on the interface shown in b in FIG. 1, as shown in FIG. 2, the touch chip of the electronic device samples, by using a 3 V sampling pulse sequence, source data generated by a trigger operation in the touchscreen. Then, an MCU of the touch chip of the electronic device calculates position information of the trigger operation in the touchscreen based on the source data. Because a computing speed is slow because a clock rate of the MCU of the touch chip is lower, the second duration t2 for calculating the position information of the trigger operation in the touchscreen may be longer. For example, the second duration t2 is 4 ms. In this way, the touch chip transmits the position information to the CPU of the electronic device by using an I2C bus, where the first duration for the touch chip to transmit the position information is t1 (for example, the first duration t1 may be 0.2 ms). Then, based on the position information, the CPU controls the touchscreen to switch to an interface shown in c in FIG. 1(a)-FIG. 1(c) to play a video.

Because the second duration t2 for calculating the position information of the trigger operation in the touchscreen is longer, the sum of the second duration t2 and the first duration t1 may be larger. For example, the sum of the second duration t2 and the first duration t1 may be 4.2 ms. In this way, finally, the delay for the CPU to control, based on the position information, the touchscreen to switch to an interface shown in c in FIG. 1(a)-FIG. 1(c) is longer.

In view of this problem, this application provides a method for calculating position information in a touchscreen, where a touch chip of an electronic device samples source data generated by a trigger operation in the touchscreen: and the touch chip of the electronic device transmits the source data to a CPU by using a serial peripheral interface high-speed serial bus. The source data is used to indicate capacitance of the touch chip. The CPU of the electronic device calculates position information of the trigger operation in the touchscreen based on the source data. Because the touch chip transmits, by using the high-speed serial bus, the source data generated by the trigger operation, and a transfer rate of the high-speed serial bus in a high-speed mode is greater than a preset rate threshold, first duration t1 for the touch chip to transmit the source data generated by the trigger operation can be shorter. Further, because the position information of the trigger operation in the touchscreen is calculated in the CPU, and a computing speed of the CPU is also higher due to a higher clock rate of the CPU, second duration t2 for the CPU to calculate a position at which the user triggers the touchscreen can also be shorter. Then, a sum of the first duration t1 and the second duration t2 is also smaller. In this way, a delay of the electronic device in performing the function corresponding to the trigger operation based on the trigger operation performed by the user is shortened.

It can be understood that the foregoing electronic device may be a terminal (terminal), user equipment (user equipment, UE), a mobile station (mobile station, MS), a mobile terminal (mobile terminal, MT), and the like. The terminal device may be a mobile phone (mobile phone), a smart TV, a wearable device, a tablet computer (pad), a computer having a wireless transmission and reception function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), or the like. Embodiments of this application do not limit a specific technology and a specific device form used for the electronic device.

Figure 3:
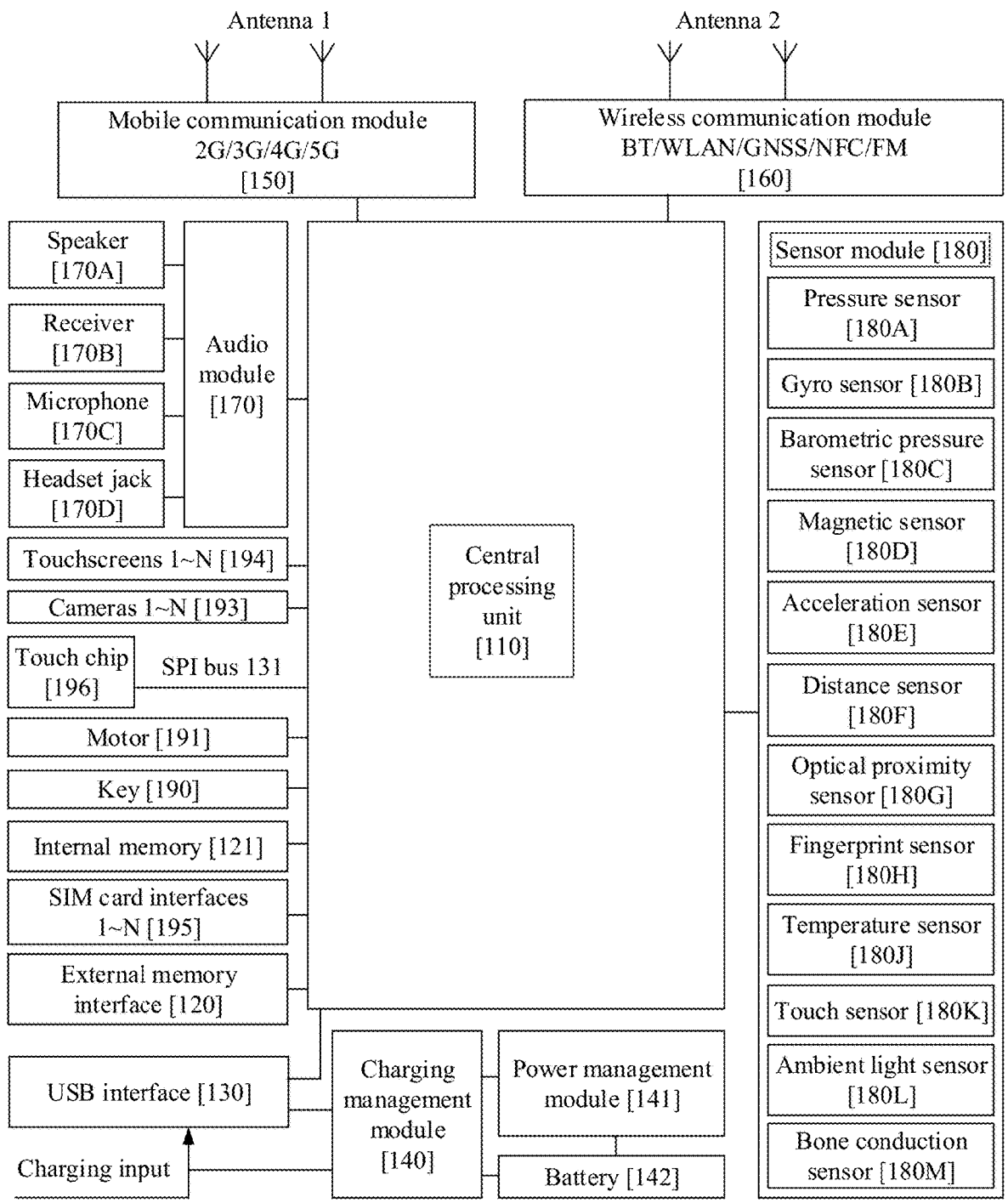
FIG. 3 is a schematic diagram of a hardware structure of an electronic device according to an embodiment of this application.

To help better understand embodiments of this application, the following describes a structure of an electronic device in the embodiments of this application. For example, FIG. 3 is a schematic diagram of a structure of an electronic device according to an embodiment of this application.

To help better understand embodiments of this application, the following describes a structure of an electronic device in the embodiments of this application. FIG. 3 is a schematic diagram of a structure of an applicable electronic device according to an embodiment of this application. As shown in FIG. 3, the electronic device may include a central processing unit (central processing unit, CPU) 110, an external memory interface 120, an internal memory 121, a universal serial bus (universal serial bus, USB) interface 130, a serial peripheral interface (serial peripheral interface, SPI) bus 131, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor 180, a key 190, a motor 191, a camera 193, a touchscreen 194, a subscriber identification module (subscriber identification module, SIM) card interface 195, a touch chip 196, and the like. It can be understood that the structure shown in this embodiment does not constitute a specific limitation on the electronic device. In some other embodiments of this application, the electronic device may further include more or fewer components than those shown in the figure, or may combine some components, or may split some components, or may have different component arrangements.

The central processing unit 110 may be a nerve center and a command center of the electronic device. The processor may generate an operation control signal based on an instruction operation code and a timing signal, to complete control of instruction fetch and instruction execution. A memory may be disposed in the central processing unit 110, and is configured to store instructions and data. In some embodiments, the memory in the central processing unit 110 is a cache. The memory may store instructions or data that is used or repeatedly used by the central processing unit 110. If the central processing unit 110 needs to reuse the instruction or the data, the instruction or the data may be directly invoked from the memory. In this case, repeated access is avoided, a waiting time of the central processing unit 110 is reduced, and efficiency of the electronic device is improved.

In some embodiments, the central processing unit 110 may include one or more interfaces. The interface may include an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general purpose input/output (general-purpose input/output, GPIO) interface, a subscriber identity module (subscriber identity module, SIM) interface, and/or a universal serial bus (universal serial bus, USB) interface, an SPI interface, and the like. It can be understood that the interface connection relationship between the modules illustrated in the embodiments of this application is merely an example for description, and does not constitute a limitation on the structure of the electronic device. In some other embodiments of this application, the electronic device may alternatively use an interface connection mode that is different from those in the foregoing embodiments, or use a combination of a plurality of interface connection modes.

A wireless communication function of the electronic device may be implemented by using the antenna 1, the antenna 2, the mobile communication module 150, the wireless communication module 160, a modem processor, a baseband processor, and the like. The antenna 1 and the antenna 2 are configured to transmit and receive electromagnetic wave signals. Each antenna in the electronic device may be configured to cover one or more communication frequency bands. Different antennas may be further multiplexed to improve antenna utilization. For example, the antenna 1 may be multiplexed into a diversity antenna of a wireless local area network. In some other embodiments, the antenna may be used in combination with a tuning switch.

The wireless communication module 160 may provide wireless communication solutions applied to the electronic device, including a wireless local area network (wireless local area networks, WLAN), Bluetooth, a global navigation satellite system (global navigation satellite system, GNSS), frequency modulation (frequency modulation, FM), NFC, an infrared (infrared, IR) technology, and the like. The wireless communication module 160 receives an electromagnetic wave by using the antenna 2, modulates and filters an electromagnetic wave signal, and sends a processed signal to the central processing unit 110. The wireless communication module 160 may further receive a to-be-sent signal from the central processing unit 110, perform frequency modulation and amplification on the signal, and convert, by using the antenna 2, the signal into an electromagnetic wave for radiation.

A display function of the electronic device may be implemented by using a GPU, the touchscreen 194, an application processor, and the like. The application processor may include an NPU and a DPU. The GPU is a microprocessor used for image processing, and is connected to the touchscreen 194 and the application processor. The GPU is configured to perform mathematical and geometric computation, and is configured to perform graphics rendering. The central processing unit 110 may include one or more GPUs, and the one or more GPUs execute instructions to generate or change display information. The NPU is a neural-network (neural-network, NN) computing processor, by referring to a biological neural-network structure. The DPU is also referred to as a display sub-system (Display Sub-System, DSS). The DPU is configured to adjust the color of the touchscreen 194, and the DPU may adjust the color of the touchscreen by using a 3D lookup table (3D look up table, 3D LUT).

The touchscreen 194 is configured to display an image, a video, or the like. The touchscreen 194 includes a display panel. The display panel may use a liquid crystal touchscreen (liquid crystal display, LCD), an organic light-emitting diode (organic light-emitting diode, OLED), an active-matrix organic light-emitting diode (active-matrix organic light emitting diode, AMOLED), a flex light-emitting diode (flex light-emitting diode, FLED), Miniled, MicroLed, Micro-oLed, a quantum dot light-emitting diode (quantum dot light emitting diodes, QLED), and the like. In some embodiments, the electronic device may include one or N touchscreens 194, where N is a positive integer greater than 1. When the touchscreen 194 is triggered, capacitance of the touchscreen 194 changes, and when the touchscreen 194 is triggered at different positions, the capacitance of the touchscreen 194 changes differently.

The touch chip 196 may periodically transmit a sampling pulse sequence to the touchscreen 194, to collect source data generated in the touchscreen 194. The source data includes voltage signal data or current signal data of the touchscreen 194. The touch chip 196 may transmit the voltage signal data or the current signal data to the central processing unit 110 by using the SPI bus 131. In addition, an MCU is further integrated in the touch chip 196, where the clock rate of the MCU is 200 MHz~400 MHz, and the MCU may be configured to perform processing such as analog-to-digital conversion on signals.

The touch chip 196 may transmit the voltage signal data or the current signal data to the central processing unit 110 by using the SPI bus. The SPI 131 is a high-speed, full-duplex, and synchronous communication bus, and only four wires are occupied on pins of the chip, thereby saving the pins of the chip and space.

The electronic device can implement a photographing function by using an ISP, one or more cameras 193, a video codec, the GPU, one or more touchscreens 194, the application processor, and the like.

The external memory interface 120 may be configured to connect to an external memory card, for example, a micro SD card, to expand a storage capacity of the electronic device. The external memory card communicates with the central processing unit 110 by using the external memory interface 120, so as to implement a data storage function.

The internal memory 121 can be configured to store one or more computer programs, and the one or more computer programs include instructions. The central processing unit 110 enables, by running the foregoing instructions stored in the internal memory 121, the electronic device to execute various function applications, data processing, and the like. The internal memory 121 may include a program storage area and a data storage area. The program storage area can store an operating system. The program storage area can further store one or more applications (such as a gallery and contacts), and the like. The data storage area can store data (such as photos and contacts) and the like created during use of the electronic device.

The electronic device may implement an audio function by using the audio module 170, the speaker 170A, the receiver 170B, the microphone 170C, an application central processing unit, and the like. The audio function is, for example, music play back and sound recording.

The audio module 170 is configured to convert digital audio information into an analog audio signal for outputting, and is further configured to convert an analog audio input into a digital audio signal. The speaker 170A, also referred to as a "loudspeaker", is configured to convert an audio electrical signal into a sound signal. The electronic device may be configured to listen to music or a hands-free call by using the speaker 170A. The receiver 170B is configured to convert an audio electrical signal into a sound signal. When the electronic device receives a call or a voice message, the receiver 170B can be placed near a person's ear to answer the voice. The microphone 170C is configured to convert a sound signal into an electrical signal.

The pressure sensor 180A is configured to sense a pressure signal and can convert the pressure signal into an electrical signal. In some embodiments, the pressure sensor 180A may be disposed on the touchscreen 194. A gyro sensor 180B may be configured to determine a motion posture of the electronic device. A barometric pressure sensor 180C is used to measure a barometric pressure. A magnetic sensor 180D includes a Hall sensor. An acceleration sensor 180E may detect magnitudes of acceleration rates of the electronic device in various directions (usually on three axes). A distance sensor 180F is configured to measure a distance. An optical proximity sensor 180G may include, for example, a light-emitting diode (LED) and an optical detector, for example, a photodiode. An ambient light sensor 180L is configured to sense luminance of ambient light. A fingerprint sensor 180H is configured to collect a fingerprint. A temperature sensor 180J is configured to detect a temperature. A touch sensor 180K is also referred to as a "touch device". The touch sensor 180K may be disposed on the touchscreen 194, and the touch sensor 180K and the touchscreen 194 constitute a touchscreen. A bone conduction sensor 180M may obtain a vibration signal.

The key 190 includes a start key, a volume key, and the like. The key 190 may be a mechanical key, or may be a touch key. The electronic device can receive a key input, and generate a key signal input related to user setting and function control of the electronic device. An indicator 192 may be an indicator light, and may be configured to indicate a charging state, a power change, and the like.

Figure 4:
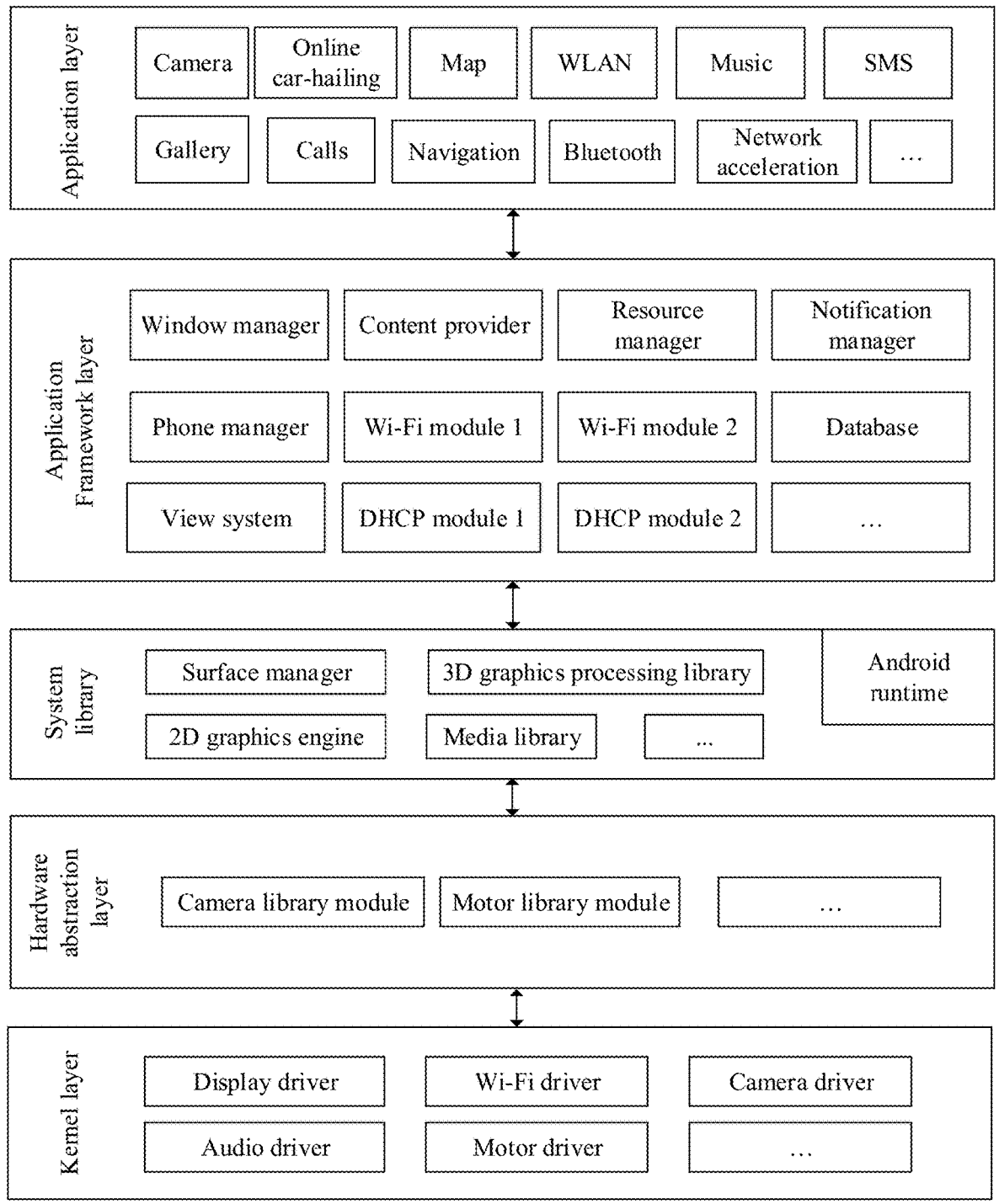
FIG. 4 is a schematic diagram of a software architecture of an electronic device according to an embodiment of this application.

A software system of the electronic device may use a hierarchical architecture, an event-driven architecture, a microkernel architecture, a microservice architecture, or a cloud architecture. In this embodiment of this application, an Android system with a hierarchical architecture is used as an example to describe a software architecture of an electronic device. FIG. 4 is a block diagram of a software architecture of an applicable electronic device according to an embodiment of this application. The hierarchical architecture divides a software system of the electronic device into several layers, and each layer has a clear role and division of labor. The layers communicate with each other by using a software interface. In some embodiments, the Android system may be divided into five layers: an application (applications) layer, an application framework (application framework) layer, an Android runtime (Android runtime) and a system library, a hardware abstraction layer (hardware abstract layer, HAL), and a kernel (kernel) layer.

The application layer may include a series of application packages. The application layer runs an application by invoking an application programming interface (application programming interface, API) provided by the application framework layer. As shown in FIG. 3, the application packages may include applications such as WeChat, camera, gallery, calendar, phone, maps, navigation, WLAN, Bluetooth, music, videos, and SMS.

The application framework layer provides an API and a programming framework for the applications at the application layer. The application framework layer includes some predefined functions. As shown in FIG. 4, the application framework layer may include a window manager, a content provider, a view system, a phone manager, a resource manager, a notification manager, and the like.

The Android runtime includes a core library and a virtual machine. The Android runtime is responsible for scheduling and management of the Android system. The core library includes two parts: One part is a function that needs to be invoked by a java language, and the other part is a core library of Android. The application layer and the application framework layer run on the virtual machine. The virtual machine executes Java files at the application layer and the application framework layer as binary files. The virtual machine is configured to perform functions such as object lifecycle management, stack management, thread management, security and abnormality management, and garbage collection. The system library may include a plurality of functional modules.

The hardware abstraction layer may include a plurality of library modules. The library modules may be a camera library module, a motor library module, and the like. The Android system may load a corresponding library module for device hardware, to implement accessing of the device hardware by the application framework layer.

The kernel layer is a layer between hardware and software. The kernel layer is used to drive hardware, so that the hardware operates. The kernel layer includes at least a display driver, a camera driver, an audio driver, a sensor driver, a motor driver, and the like. This is not limited in this embodiment of this application.

The following describes, by using specific embodiments, in detail the technical solutions of this application and how the technical solutions of this application resolve the foregoing technical problems. The following several specific embodiments may be implemented independently, or may be combined with each other. For same or similar concepts or processes, details may not be described in some embodiments again.

Figure 5:
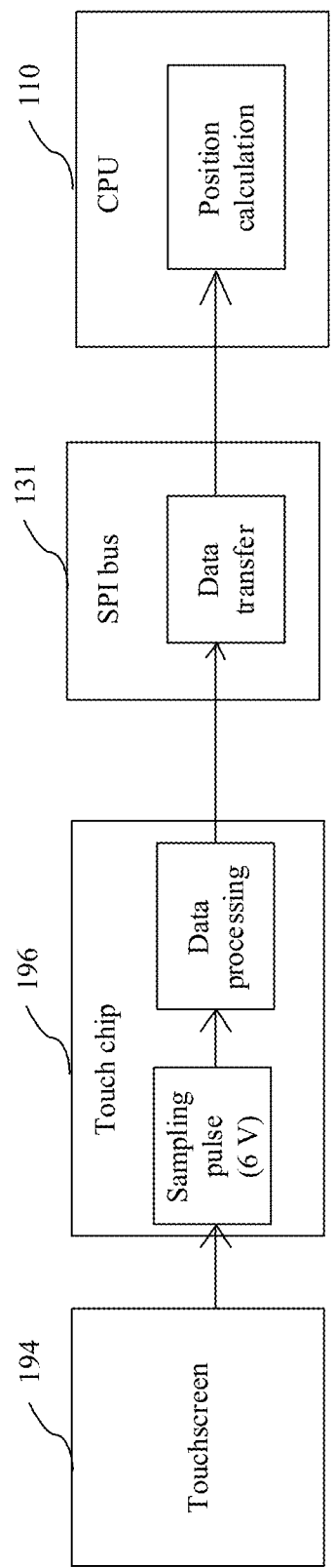
FIG. 5 is a schematic diagram of an architecture in which a function corresponding to a control at position information is performed when a touchscreen of an electronic device is triggered according to an embodiment of this application.
Figure 6:
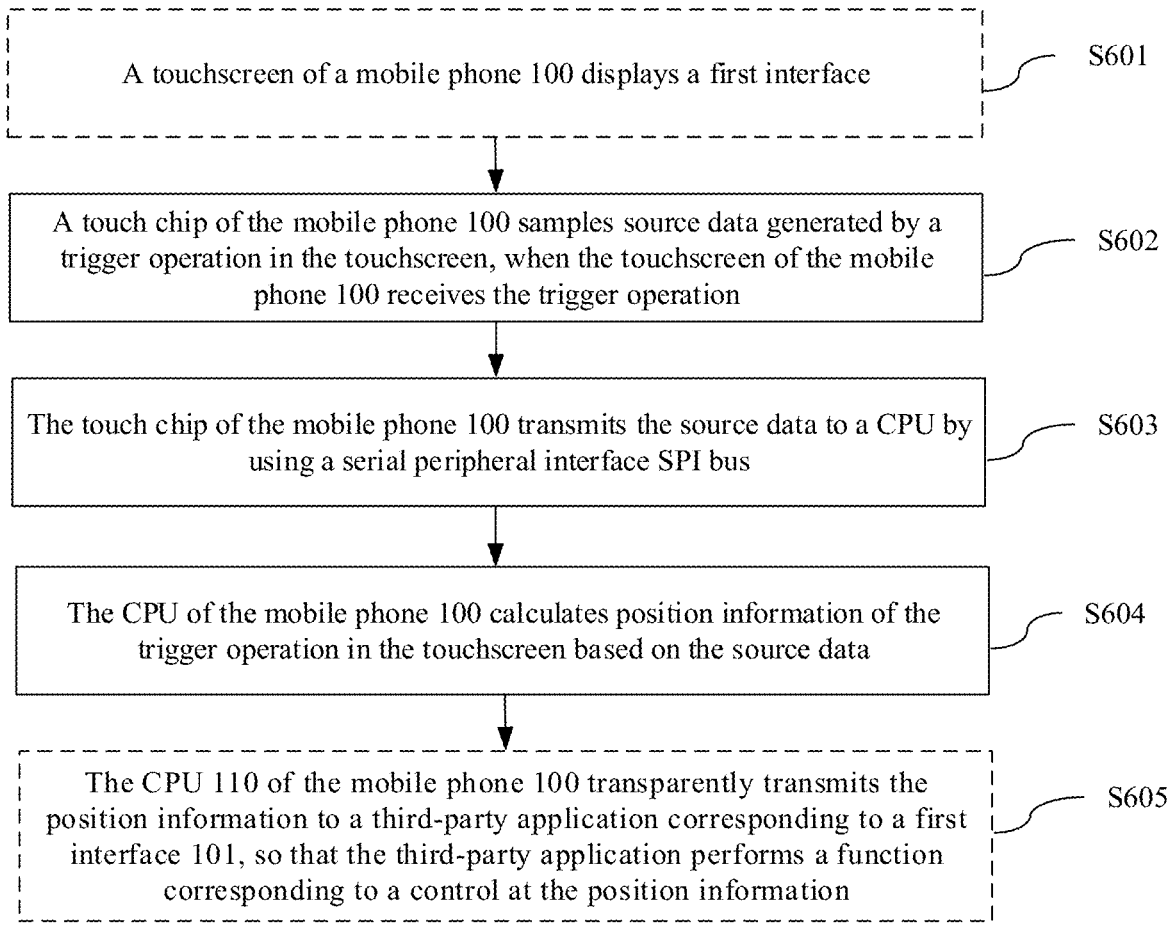
FIG. 6 is a flowchart of a method for calculating position information in a touchscreen according to an embodiment of this application.

An example in which the electronic device is a mobile phone 100 and the high-speed serial bus is an SPI bus 131 is used as an example below to describe the method for calculating position information in a touchscreen according to this embodiment of this application, and this example does not constitute a limitation on this embodiment of this application. The following embodiments may be combined with each other, and the same or similar concepts or processes are not described again. As shown in FIG. 5, the mobile phone 100 includes a touchscreen 194, a touch chip 196, an SPI bus 131, and a CPU 110. The touchscreen 194 is electrically connected to the touch chip 196, and the CPU 110 is in communication connection with the touch chip 196 by using the SPI bus 131. FIG. 6 is a schematic flowchart of a method for calculating position information in a touchscreen according to an embodiment of this application. As shown in FIG. 6, the method for calculating position information in a touchscreen according to this embodiment of this application includes the following steps.

S601: A touchscreen 194 of a mobile phone 100 displays a first interface.

For example, still as shown in (b) in FIG. 1, in this embodiment of this application, the first interface may be a Moments interface of WeChat®. The WeChat® Moments interface includes a video control 101.

In addition, the first interface can alternatively be a photo preview interface of a camera application, an interface of a game application, a system desktop, or the like. This is not limited herein.

It should be noted that the touchscreen 194 may alternatively be an off state. It can be understood that step S601 can be ignored when the touchscreen 194 is in the off state.

S602: A touch chip 196 of the mobile phone 100 samples source data generated by a trigger operation in the touchscreen 194, when the touchscreen 194 of the mobile phone 100 receives the trigger operation.

The touch chip 196 may periodically transmit a sampling pulse sequence to the touchscreen 194, to collect the source data generated in the touchscreen 194. The source data is a voltage signal or a current signal of the touchscreen 194. It can be understood that the source data may be used to indicate capacitance of the touch chip.

For example, based on the foregoing embodiment corresponding to FIG. 1, when the touchscreen 194 of the mobile phone 100 displays the Moments interface of WeChat®, the sampling pulse sequence transmitted by the touch chip 196 can sample the source data generated when the touchscreen 194 displays the Moments interface of WeChat®. When the video control 101 in the Moments interface of WeChat® is triggered by a finger of the user, the sampling pulse sequence transmitted by the touch chip 196 can sample the source data generated by the trigger operation in the touchscreen 194. It can be understood that when the touchscreen 194 is triggered, the source data sampled by the touch chip 196 is different from source data sampled when the touchscreen 194 is not triggered.

S603: The touch chip 196 of the mobile phone 100 transmits the source data to the CPU 110 by using a serial peripheral interface SPI bus 131.

The specific implementation of step S603 includes, but is not limited to, the following two manners.

Manner 1: The CPU 110 reads the sampled source data from the touch chip 196 by using the SPI bus 131. Specifically, the sampling pulse sequence in step S602 includes a plurality of sampling pulses, and each sampling pulse samples a piece of subdata generated in the touchscreen 194. After the sampling is completed, the touch chip 196 processes and packs a plurality of pieces of sampled subdata into source data. The CPU 110 reads the source data by using the SPI bus 131.

Manner 2: The touch chip 196 writes the sampled source data to the CPU 110 by using the SPI bus 131. Specifically, the sampling pulse sequence in step S602 includes a plurality of sampling pulses, and each sampling pulse samples a piece of subdata generated in the touchscreen 194. After the sampling is completed, the touch chip 196 processes and packs a plurality of pieces of sampled subdata into source data. The touch chip 196 writes the source data into the CPU 110 by using the SPI bus 131.

When the SPI bus 131 is in a high-speed mode, the data transfer rate can usually reach 20 Mbps. It can be learned that SPI bus 131 has a higher data transfer rate. Then, the first duration t1 for the CPU 110 to read the source data from the touch chip 196 or the touch chip 196 to write the source data to the CPU 110 can be shorter. The first duration t1 is usually less than 1.5 ms.

It can be understood that the source data sampled by the touch chip 196 is an analog signal. Before transmitting the source data to the CPU 110, the touch chip 196 needs to convert the analog signal into a digital signal and format the digital signal, so that the CPU 110 can recognize the digital signal.

S604: The CPU 110 of the mobile phone 100 calculates position information of the trigger operation in the touchscreen based on the source data.

Figure 7:
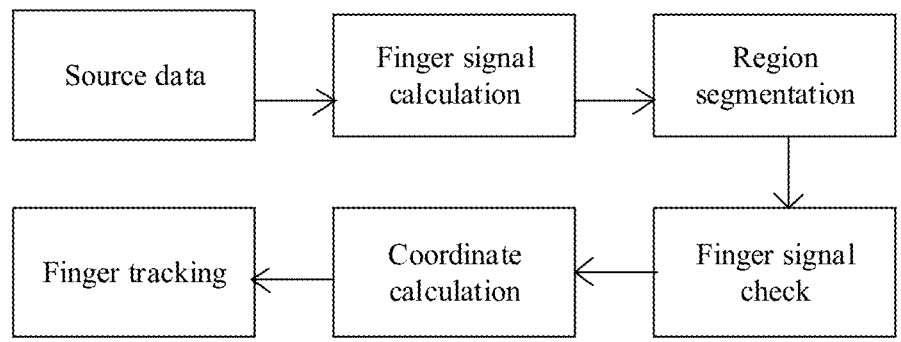
FIG. 7 is a flow block diagram of calculation of position information according to an embodiment of this application.

For example, as shown in FIG. 7, the mobile phone 100 detects a variation of source data in a data form of a digital signal (such as a change amount of a current signal or a change amount of a voltage signal), to preliminarily determine signals generated through triggering by a finger of the user. The mobile phone 100 performs region segmentation on the preliminarily determined signals generated through triggering by the user, to obtain sub-signals corresponding to each region. The mobile phone 100 further checks whether the sub-signals corresponding to each region are signals generated through triggering by the finger of the user: and if yes, the mobile phone 100 determines, based on signal distribution in each sub-region, center-of-mass coordinates (that is, coordinates when the video control 101 of the Moments interface of the WeChat® in the embodiment corresponding to FIG. 1(a)-FIG. 1(c) is triggered) when the sub-regions are triggered by the finger of the user. It can be understood that the center-of-mass coordinates are the calculated position information. In addition, the mobile phone 100 can further track the position of the finger on the touchscreen 194, so as to determine a moving track of the finger on the touchscreen 194.

It can be learned that the foregoing process of calculating the position information of the trigger operation in the touchscreen is relatively complicated, and the clock rate of the CPU 110 is usually greater than 1.5 GZ. It can be understood that a higher clock rate of the CPU 110 indicates a higher clock frequency of the CPU 110, that is, a stronger computing capability of the CPU 110, and a higher rate of calculating the position information of the trigger operation in the touchscreen. Then, the second duration t2 for the CPU 110 to calculate the position information of the trigger operation in the touchscreen is also shorter. The second duration t2 is usually less than 1 ms.

S605: The CPU 110 of the mobile phone 100 transparently transmits the position information to a third-party application corresponding to a first interface 101, so that the third-party application performs a function corresponding to a control at the position information.

For example, based on the embodiment corresponding to FIG. 1, it can be understood that the third-party application corresponding to the first interface 101 is WeChat®, and the CPU 110 of the mobile phone 100 controls WeChat® to switch to an interface of c in FIG. 1(*a*)-FIG. 1(*c*) to play a video. Controlling WeChat® to switch to the interface of c in FIG. 1(*a*)-FIG. 1(*c*) to play a video is the function corresponding to the control (that is, the video control 101) at the position information. It should be noted that step S605 may be omitted in the method for calculating position information in a touchscreen.

Based on steps S601-S605, it can be understood that a delay t3 from a time when the touchscreen 194 of the mobile phone 100 receives the trigger operation to a time when the third-party application performs the function corresponding to the control at the position information includes the first duration t1 for the touch chip 196 to transmit the source data to the CPU 110 and the second duration t2 for the CPU 110 to calculate the position information of the trigger operation in the touchscreen.

Based on the foregoing description, in the method for calculating position information in a touchscreen according to this embodiment of this application, because the touch chip 196 transmits, by using the SPI bus 131, and the source data generated by the trigger operation, and the SPI bus 131 has a higher transfer rate, the first duration t1 for the touch chip 196 to transmit the source data generated by the trigger operation can be shorter. Further, because the position information of the trigger operation in the touchscreen is calculated in the CPU, and a computing speed of the CPU 110 is also higher due to a higher clock rate of the CPU 110, the second duration t2 for the CPU 110 to calculate coordinates of a position at which the user triggers the touchscreen 194 can also be shorter. In this way, a sum of the first duration t1 and the second duration t2 can be smaller.

In this way, the delay t3 from the time when the touchscreen 194 of the mobile phone 100 receives the trigger operation to the time when the third-party application performs the function corresponding to the control at the position information includes the first duration t1 for the touch chip 196 to transmit the source data to the CPU 110 and the second duration t2 for the CPU 110 to calculate the position information of the trigger operation in the touchscreen. In this way; when the sum of the first duration t1 and the second duration t2 is smaller, the delay t3 from the time when the touchscreen 194 of the mobile phone 100 receives the trigger operation to the time when the third-party application performs the function corresponding to the control at the position information is shortened. In this way, user experience can be improved.

Figure 8:
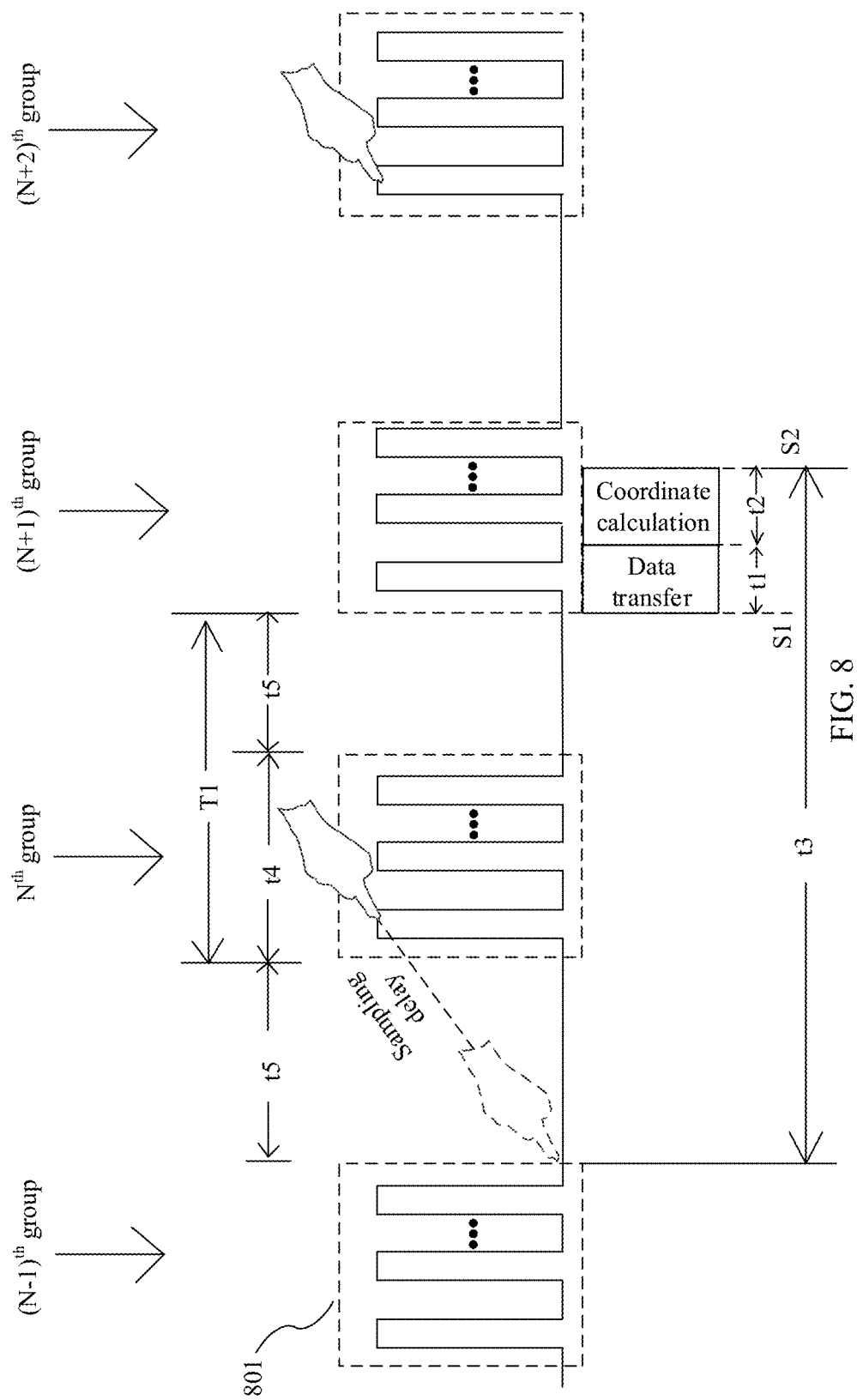
FIG. 8 is a first schematic diagram showing that a touch chip transmits a sampling pulse sequence based on a preset sampling period according to an embodiment of this application.

It can be understood that, in the foregoing embodiment, how to shorten the sum of the first duration t1 and the second duration t2 is used as an example to describe how to shorten the delay t3 from the time when the touchscreen 194 of the mobile phone 100 receives the trigger operation to the time when the third-party application performs the function corresponding to the control at the position information. With reference to FIG. 8, how to shorten a sampling period T1 based on the shortening of the sum of the first duration t1 and the second duration t2 is described below; to further shorten the delay t3 from the time when the touchscreen 194 of the mobile phone 100 receives the trigger operation to the time when the third-party application performs the function corresponding to the control at the position information.

As shown in FIG. 8, the touch chip 196 may transmit a sampling pulse sequence 801 to the touchscreen 194 every preset sampling period T1. A start time S1 preset by the touch chip 196 for transmitting, to the CPU 110, the source data sampled by an $N^{th}$ group of sampling pulse sequence 801 may be a start time for the touch chip 196 to transmit a $(N+1)^{th}$ group of sampling pulse sequence 801 to the touchscreen 194, where N is an integer greater than 1. In this way, still as shown in FIG. 8, when the preset sampling period T1 is greater than the sum of the first duration t1 and the second duration t2, the transmission of the $(N+1)^{th}$ group of sampling pulse sequence 801 by the touch chip 196 to the touchscreen 194 can be performed in parallel with the transmission of the source data by the touch chip 196 to the CPU 110 by using the SPI bus 131 and the calculation of the position information by the CPU 110, as a prerequisite for shortening the sampling period T1.

Figure 9:
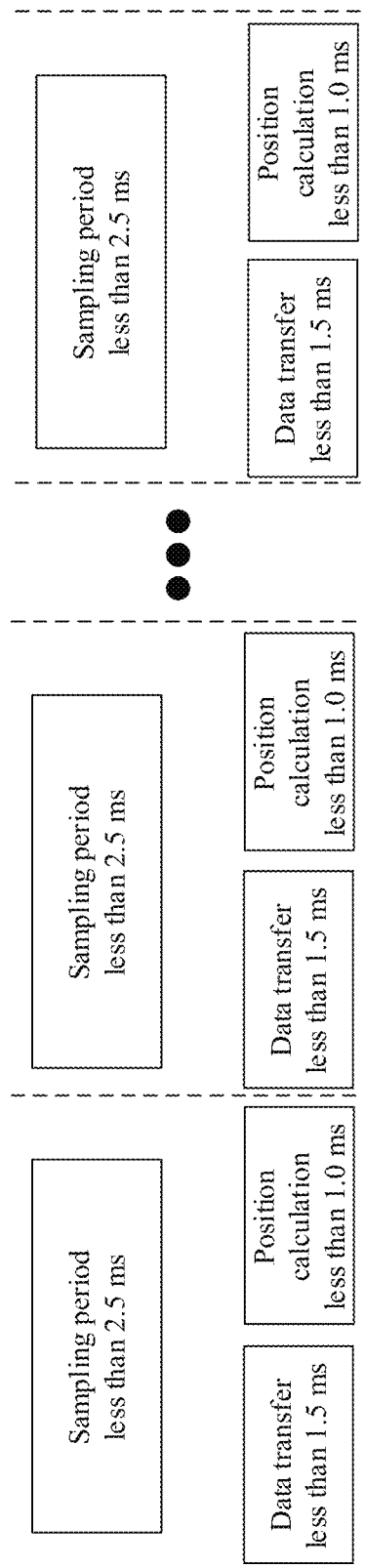
FIG. 9 is a second schematic diagram showing that a touch chip transmits a sampling pulse sequence based on a preset sampling period according to an embodiment of this application.

Based on the foregoing description, because the sum of the first duration t1 and the second duration t2 is smaller, the preset sampling period T1 of the mobile phone 100 may be less than a preset duration threshold. For example, as shown in FIG. 9, because the sum of the first duration t1 (less than 1.5 ms) and the second duration t2 (less than 1 ms) is smaller, the preset sampling period T1 may also be smaller. If the sum of the first duration t1 and the second duration t2 is less than 2.5 ms, the sampling period T1 may also be preset to be less than 2.5 ms (that is, a sampling rate of the touch chip 196 is greater than 400 Hz). In addition, the sampling period T1 may alternatively be preset to 2.5 ms.

It can be learned from FIG. 8 that fourth duration for which the pulse sequence lasts is t4, and fifth duration between every two groups of sampling pulse sequences 801 is t5. The fifth duration t5 is equal to a difference between a sampling period T1 and the fourth duration t4 for which the pulse sequence lasts. It can be understood that the fifth duration t5 can be shorter when the preset sampling period T1 of the mobile phone 100 is less than the preset duration threshold and the fourth duration t4 for which the pulse sequence lasts is unchanged. In this way, even if a time when the user performs the trigger operation on the touchscreen 194 is between two groups of sampling pulse sequences 801, the delay from the sampling of the $N^{th}$ group of sampling pulse sequence 801 to the trigger operation on the touchscreen 194 by the user is still shortened. In addition, it can be learned from FIG. 8 that because the fifth duration t5 is a part of the foregoing duration t3, when the fifth duration t5 is shorter, the delay t3 from the time when the touchscreen 194 of the mobile phone 100 receives the trigger operation to the time when the third-party application performs the function corresponding to the control at the position information can be shortened, thereby further improving user experience.

In conclusion, in the embodiment corresponding to FIG. 8, when the sum of the first duration t1 and the second duration t2 (less than 1 ms) is smaller, the preset sampling period T1 of the mobile phone 100 can also be smaller, so that the fifth duration t5 between every two groups of sampling pulse sequences can be smaller. Then, the delay t3 from the time when the touchscreen 194 of the mobile phone 100 receives the trigger operation to the time when the third-party application performs the function corresponding to the control at the position information can also be smaller.

In addition, in step S602, the shortening of the first duration t1 for the touch chip 196 to transmit the source data to the CPU 110 depends on performance of SPI bus 131. In some other embodiments, the first duration t1 for the touch chip 196 to transmit the source data to the CPU 110 can be further shortened based on a data transfer scheduling mode.

Figure 10:
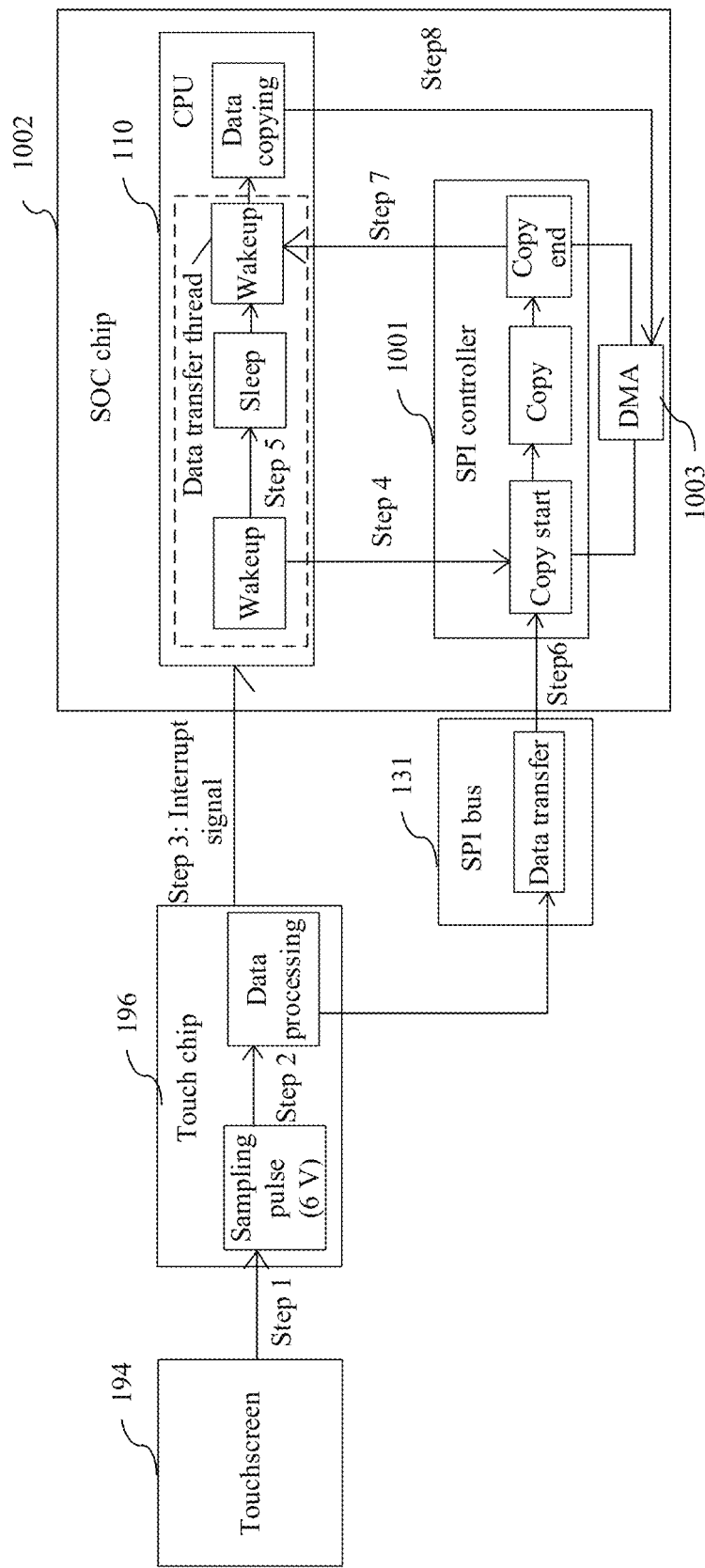
FIG. 10 is a schematic diagram of an architecture of a data transfer scheduling mode according to an embodiment of this application.

For example, as shown in FIG. 10, the mobile phone 100 may further include an SPI controller 1001, where an SPI bus 131, the SPI controller 1001, and a CPU 110 are sequentially in communication connection with each other. The SPI controller 1001 and the CPU 110 may be integrated into a system on a chip (system on a Chip, SOC) 1002 in the mobile phone 100. In addition, the SPI controller 1001 is further connected to a DMA (Direct Memory Access, direct memory access) 1003, and the DMA 1003 can transmit data between the SPI controller 1001 and the touch chip 196, without the participation of the CPU 110 during the transmission. In addition, a priority of instructing to wake up the data transfer thread preset in the CPU 110 is higher than that of another to-be-processed thread in the CPU 110, and a priority of a thread that is preset in the SPI controller 1001 and that is used to instruct to occupy the DMA 1003 is higher than that of another to-be-processed thread in the SPI controller 1001.

Specifically, the data transfer scheduling mode includes the following steps. Step 1: The touch chip 196 transmits a sampling pulse sequence to the touchscreen 194 to sample the source data. Step 2: Before transmitting data, the touch chip 196 may convert sampled analog signals into digital signals and pack the digital signals to obtain source data. The size of the source data is usually between 2 KB-4 KB. Step 3: The touch chip 196 sends a first notification (the first notification is an interrupt signal in FIG. 10) to the CPU 110 after packing, and the first notification is used to instruct the CPU 110 to wake up a data transfer thread. Because the priority of instructing the preset data transfer thread in the CPU 110 is higher than that of another to-be-processed thread in the CPU 110, the CPU 110 determines that the priority of the data transfer thread is higher than that of another to-be-processed thread in the CPU 110, and the CPU 110 can wake up the data transfer thread without waiting for completion of processing of the another to-be-processed thread, so that the duration for the touch chip 196 to wake up the data transfer thread of the CPU 110 is smaller. Step 4: After waking up the data transfer thread, the CPU 110 sends a second notification to the SPI controller 1001, where the second notification is used to indicate that the SPI controller 1001 occupies the DMA 1003. Step 5: After sending the second notification to the SPI controller 1001, the CPU 110 controls the data transfer thread to start sleeping. In this way, the CPU 110 may also process another to-be-processed thread during sleep of the data transfer thread.

After receiving the second notification, the SPI controller 1001 adds a DMA flag, where the flag is used to indicate that the DMA is occupied by the SPI controller 1001. Because the priority of the thread that is preset in the SPI controller 1001 and that is used to instruct to occupy the DMA 1003 is higher than a priority threshold, it is determined that the priority of the thread of occupying the DMA 1003 is higher than that of another to-be-processed thread in the SPI controller 1001, and the SPI controller 1001 occupies the DMA 1003 without waiting for completion of processing of the another to-be-processed thread, so that the duration for occupying the DMA 1003 is also smaller. Then, step 6: The SPI controller 1001 copies the source data from the touch chip 196 by using the SPI bus 131, and temporarily stores the copied source data in the DMA 1003. Step 7: After the copying is completed, the SPI controller 1001 sends a third notification to the CPU 110, where the third notification is used to instruct the CPU 110 to extract the source data. Because the priority of instructing the preset data transfer thread in the CPU 110 is higher than that of another to-be-processed thread in the SPI controller 1001, the CPU 110 determines that the priority of the data transfer thread is higher than that of another to-be-processed thread in the CPU 110, and the CPU 110 can wake up the data transfer thread without waiting for completion of processing of the another to-be-processed thread, so that the duration for waking up the data transfer thread is smaller. Step 8: After the data transfer thread of the CPU 110 is waked up, the copied source data is extracted from the DMA 1003. Then, the touch chip 196 transmits the source data to the CPU 110 by using the SPI bus 131.

It can be learned that, in the embodiment corresponding to FIG. 10, because the duration for waking up the data transfer thread of the CPU 110 is shorter, and the duration for occupying the DMA 1003 is also shorter, the rate at which the touch chip 196 transmits the source data to the CPU 110 can be increased, and the first duration t1 for the touch chip 196 to transmit the source data to the CPU 110 is shortened. In this way, the sum of the first duration t1 and the second duration t2 can be further shortened. It can be understood that based on the same principle as the embodiment corresponding to FIG. 8, when the sum of the first duration t1 and the second duration t2 is further smaller, the sampling period T1 can also be further smaller, so that the delay t3 from the time when the touchscreen 194 of the mobile phone 100 receives the trigger operation to the time when the third-party application performs the function corresponding to the control at the position information can be further shortened.

Figure 11:
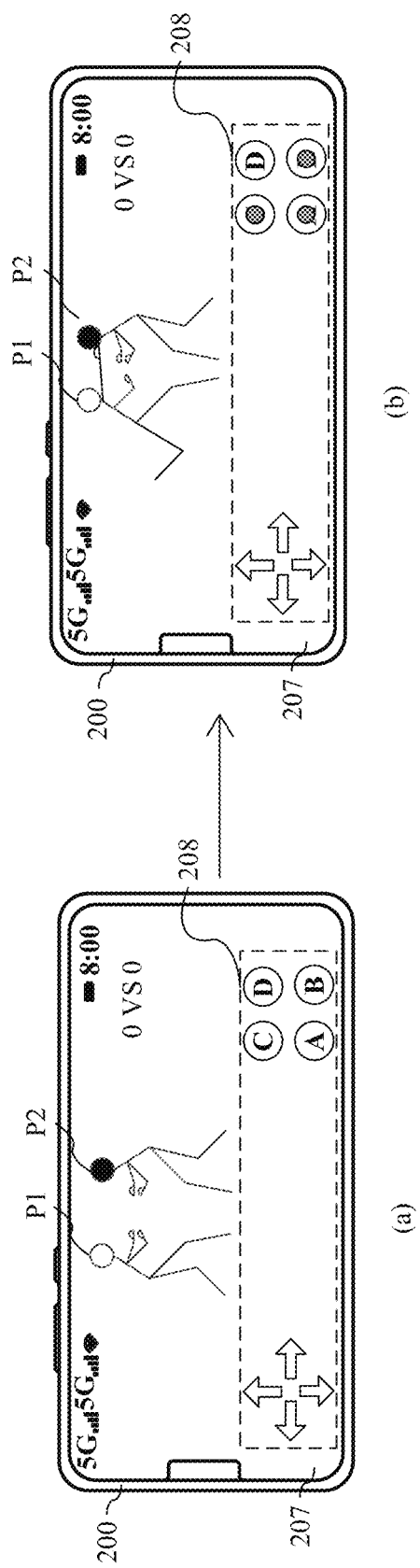
FIG. 11 is a schematic diagram of an interface when a touchscreen is triggered by multiple fingers according to an embodiment of this application.
Figure 12:
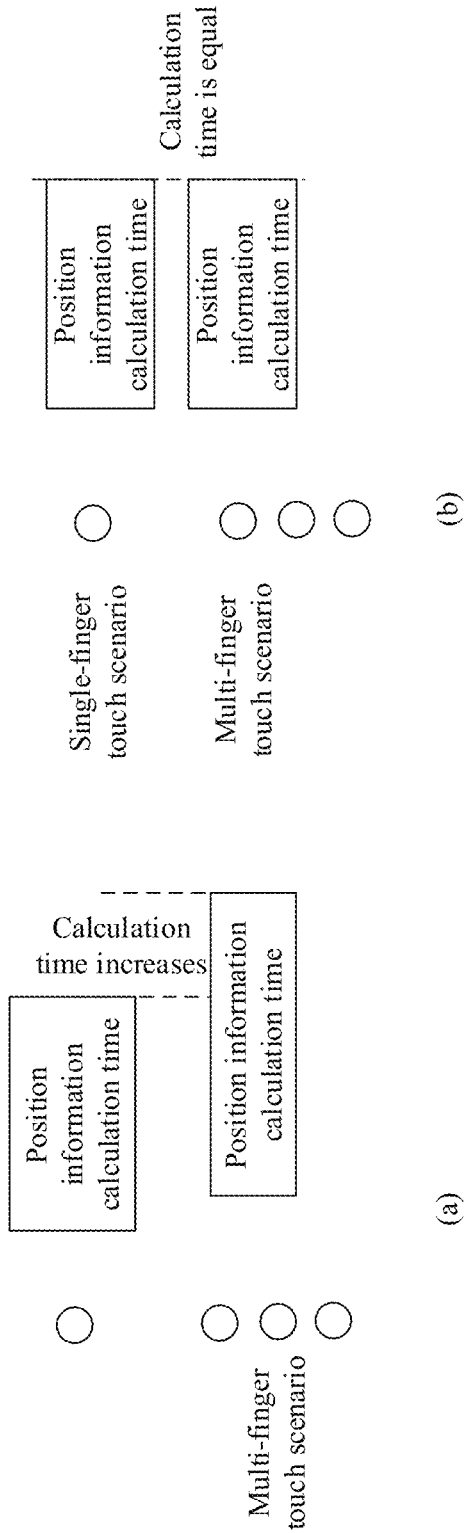
FIG. 12 is a first schematic diagram showing calculation of duration of position information when a touchscreen is triggered by multiple fingers as opposed to a single finger.
Figure 13:
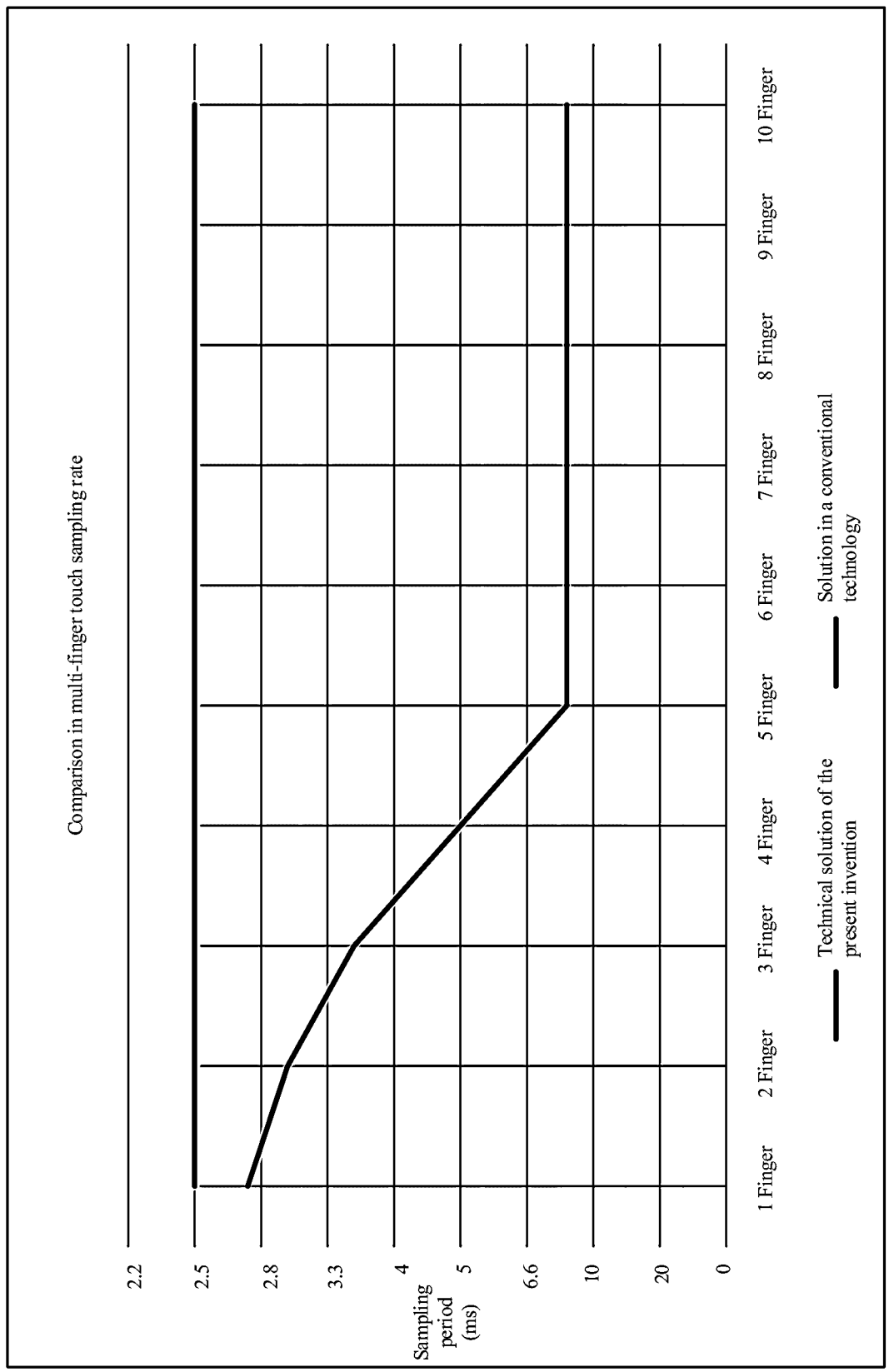
FIG. 13 is a second schematic diagram showing calculation of duration of position information when a touchscreen is triggered by multiple fingers as opposed to a single finger.

It should be noted that, in the foregoing embodiment, an example in which the touchscreen 194 is triggered by a single finger of the user is used as an example to describe how to make the sampling period T1 smaller. With reference to FIG. 11 to FIG. 13, it is described how to make the sampling period T1 smaller when the touchscreen 194 is triggered by multiple fingers of the user.

As shown in (a) in FIG. 11, a first interface displayed on the touchscreen 194 is an interface of a game application. The interface of the game application includes a control A, a control B, a control C, and a control D. The game interface further includes a game character P1 and a game character P2. When the user needs to control the game character P1 to attack the game character P2 with a heavy hand, as shown in (b) in FIG. 11, the control A, the control B, and the control C can be triggered simultaneously. Then, the touch chip 196 samples source data of the touchscreen 194 when the control A, the control B, and the control C are triggered. It can be understood that when the touchscreen 194 is triggered by more fingers of the user, the touch chip 196 samples more source data. The touch chip 196 transmits the sampled source data to the CPU 110 by using the SPI bus 131. The CPU 110 of the mobile phone 100 calculates position information of a trigger operation in the touchscreen based on the source data. It can be understood that the position information calculated by the CPU 110 based on the source data includes coordinates of the control A triggered by a finger of the user, coordinates of the control B triggered by a finger of the user, and coordinates of the control C triggered by a finger of the user. Then, the CPU 110 controls the game character P1 to attack the game character P2 with a heavy hand based on the coordinates of the control A, the coordinates of the control B, and the coordinates of the control C.

According to the inventor's test, in a solution in a conventional technology, as shown in (a) in FIG. 12, because the clock rate of the MCU of the touch chip 196 is lower, the second duration t2 for the MCU to calculate position information of a trigger operation in the touchscreen is longer when more source data needs to be processed. Then, when the second duration t2 is longer, the sum of the first duration t1 and the second duration t2 is also longer. As a result, the sampling period T1 is also longer. In this way, the delay t3 from a time when the user triggers the control A, the control B, and the control C to a time when the user controls the game character P1 to attack the game character P2 with a heavy hand is longer.

In this embodiment of this application, as shown in (b) in FIG. 12, because the position information of the trigger operation in the touchscreen is calculated in the CPU 110, and the clock rate of the CPU 110 is larger, the second duration t2 for the CPU 110 to calculate the position information of the trigger operation in the touchscreen does not change when more source data needs to be processed. In this way, in this embodiment of this application, the sum of the first duration t1 and the second duration t2 is not prolonged when the touchscreen 194 is triggered by more fingers of the user. In this way, when the touchscreen 194 is triggered by more fingers of the user, the sampling period T1 can still be kept smaller. In this way, the delay t3 from the time when the user triggers the control A, the control B, and the control C to the time when the user controls the game character P1 to attack the game character P2 with a heavy hand may remain smaller.

In some other embodiments, the touchscreen 194 may alternatively be triggered by four fingers, five fingers, six fingers, or a different quantities of fingers of the user. As shown in FIG. 13, in a solution in a conventional technology, when the touchscreen 194 is triggered by one finger to ten fingers separately, the sampling period T1 needs to be gradually increased from 2.7 ms to 8 ms. In this embodiment of this application, when the touchscreen 194 is triggered by one finger to ten fingers, the sampling period T1 may remain unchanged at 2.5 ms. Based on the foregoing description, when the sampling period T1 is smaller, the delay t3 from the time when the touchscreen 194 of the mobile phone 100 receives the trigger operation to the time when the third-party application performs the function corresponding to the control at the position information can also be smaller. It can be understood that, it can be learned from FIG. 13 that when the touchscreen 194 is triggered by less than six fingers of the user, more fingers of the user used to trigger the touchscreen 194 indicates a more obvious effect of shortening the delay t3 in this embodiment of this application compared with the solution in the conventional technology.

It can be understood that, in the foregoing embodiment, an example in which the sampling period T1 is shortened based on the shortening of the sum of the first duration t1 and the second duration t2 is used to describe how to further shorten the delay t3 from the time when the touchscreen 194 of the mobile phone 100 receives the trigger operation to the time when the third-party application performs the function corresponding to the control at the position information. An example in which the quantity of sampling pulses in the sampling pulse sequence is further reduced based on the shortening of the sum of the first duration t1 and the second duration t2 is used below to describe how to shorten the delay t3 from the time when the touchscreen 194 of the mobile phone 100 receives the trigger operation to the time when the third-party application performs the function corresponding to the control at the position information.

Figure 14:
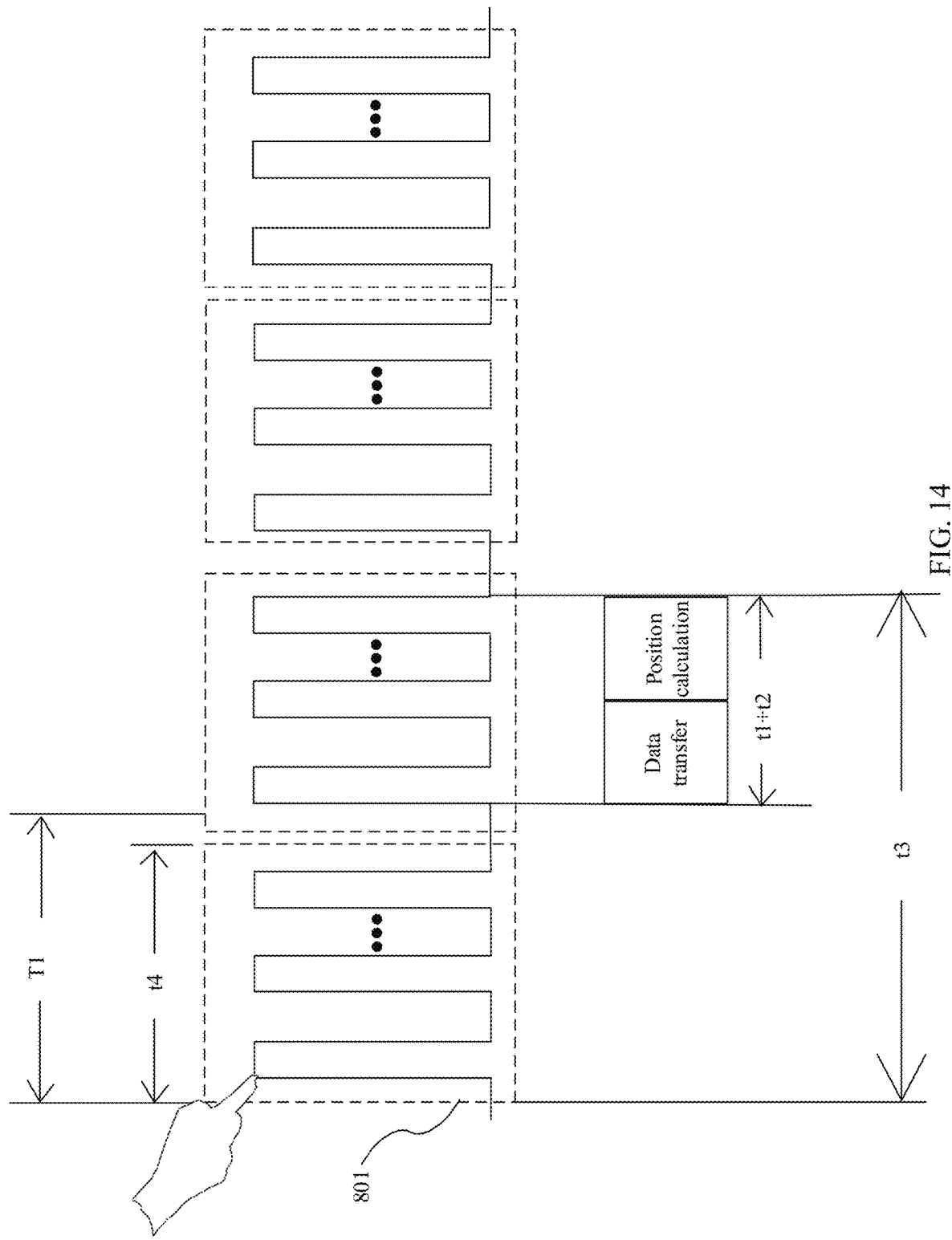
FIG. 14 is a schematic diagram showing transmission of a sampling pulse sequence when a quantity of sampling pulses in the adopted pulse sequence is less than 30 according to an embodiment of this application.

In another embodiment, as shown in FIG. 14, a quantity of sampling pulses in a sampling pulse sequence 801 transmitted by the touch chip 196 of the mobile phone 100 may be less than a preset quantity threshold. For example, the quantity of sampling pulses may be less than 30. Further, the quantity of sampling pulses may be 18, 21, 24, or the like. This is not limited herein. When the quantity of sampling pulses in the sampling pulse sequence 801 is less than the preset quantity threshold, the fourth duration t4 for which the pulse sequence lasts can be shorter (that is, the sampling duration is further shortened). In addition, it can be learned from FIG. 14 that the fourth duration t4 is a part of the foregoing delay t3. When the fourth duration t4 is shorter, the delay t3 from the time when the touchscreen 194 of the mobile phone 100 receives the trigger operation to the time when the third-party application performs the function corresponding to the control at the position information can be further shortened (that is, the sampling delay is shortened), thereby further improving user experience.

Further, based on the embodiment corresponding to FIG. 14, to improve reliability of the source data collected by the sampling pulse sequence 801, a sampling voltage of sampling pulses in the sampling pulse sequence 801 transmitted by the touch chip 196 of the mobile phone 100 may be greater than a preset voltage threshold. For example, the voltage of the sampling pulses may be greater than 3 V. For example, the voltage of the sampling pulses may be 4 V, 5 V, 6 V, 7 V, or the like. This is not limited herein. It can be understood that a greater voltage of the sampling pulses indicates higher reliability of the source data collected by the sampling pulse sequence 801.

Figure 15:
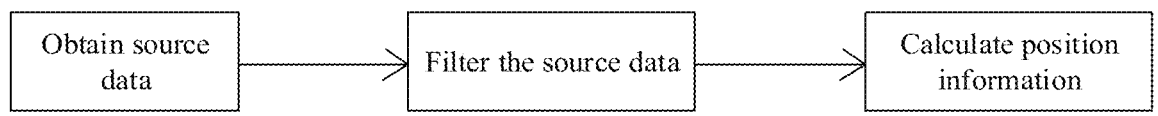
FIG. 15 is a block diagram of a method for calculating position information according to an embodiment of this application.

In addition, to improve the reliability of the position information calculated by the CPU 110, as shown in FIG. 15, after obtaining the source data sampled by the touch chip 196, the CPU 110 needs to filter the obtained source data by using a filtering algorithm, to reduce noise in the collected source data. Then, the position information calculated by the CPU 110 based on the filtered source data has higher reliability.

In addition, in the foregoing method for calculating position information in a touchscreen according to this embodiment of this application, the mentioned trigger operation may include a click operation, a touch and hold operation, a gesture trigger operation, and the like. This is not limited herein.

Figure 16:
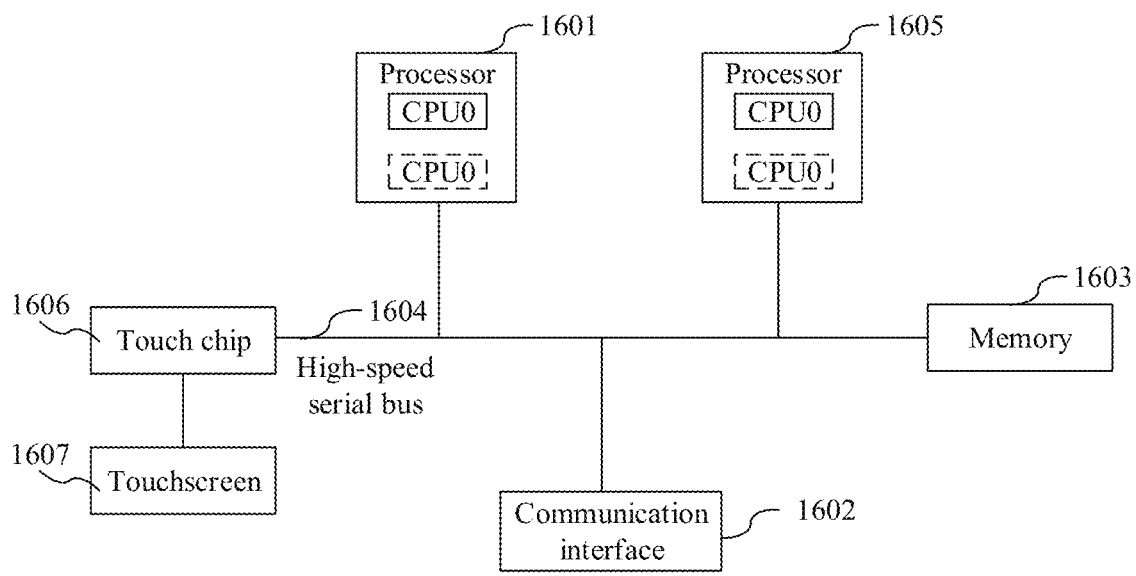
FIG. 16 is a schematic diagram of a hardware structure of an electronic device according to an embodiment of this application.

For example, FIG. 16 is a schematic diagram of a hardware structure of an electronic device according to an embodiment of this application. As shown in FIG. 16, the electronic device includes a central processing unit 1601, a high-speed serial bus 1604, at least one communication interface (for example, in FIG. 16, a communication interface 1603 is used as an example for description), a touch chip 1606, and a touchscreen 1607.

The central processing unit 1601 may be a general-purpose central processing unit (central processing unit, CPU), a micro central processing unit, an application-specific integrated circuit (application-specific integrated circuit, ASIC), or one or more integrated circuits for controlling program execution in the solutions of this application.

The high-speed serial bus 1604 may include a circuit for transmitting information between the foregoing components. When the high-speed serial bus 1604 is in a high-speed mode, the data transfer rate can usually reach 20 Mbps. It can be learned that high-speed serial bus 1604 has a higher data transfer rate. The high-speed serial bus 1604 may be an SPI bus.

The communication interface 1603 uses any apparatus such as a transceiver to communicate with another device or a communication network, such as an Ethernet or a wireless local area network (wireless local area networks, WLAN).

Possibly, the electronic device may further include a memory 1602.

The memory 1602 may be a read-only memory (read-only memory, ROM) or another type of static storage device that can store static information and instructions, a random access memory (random access memory; RAM) or another type of dynamic storage device that can store information and instructions, an electrically erasable programmable read-only memory (electrically erasable programmable read-only memory; EEPROM), a compact disc read-only memory (compact disc read-only memory, CD-ROM) or another optical disk storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may be stand-alone and connected to the central processing unit by using the high-speed serial bus 1604. The memory may alternatively be integrated with the central processing unit.

The memory 1602 is configured to store computer-executable instructions for executing the solutions in this application under control of the central processing unit 1601. The central processing unit 1601 is configured to execute computer-executable instructions stored in the memory 1602 to implement the method for calculating position information in a touchscreen according to the embodiments of this application.

Possibly, the computer-executable instructions in this embodiment of this application may alternatively be referred to as application code, which is not specifically limited in this embodiment of this application.

During specific implementation, in an embodiment, the central processing unit 1601 may include one or more CPUs, such as a CPU 0 and a CPU 1 in FIG. 16.

During specific implementation, in an embodiment, the electronic device may include a plurality of central processing units, such as the central processing unit 1601 and the central processing unit 1605 in FIG. 16. Each of these central processing units may be a single-core central processing unit (single-CPU) or a multi-core central processing unit (multi-CPU). The central processing unit herein may refer to one or more devices, circuits, and/or processing cores for processing data (such as computer program instructions).

The touch chip 1606 may periodically transmit a sampling pulse sequence to the touchscreen 1607, to collect, when the touchscreen 1607 receives a trigger operation, source data generated by the trigger operation. The source data includes voltage signal data or current signal data of the touchscreen 1607. The touch chip 1606 may transmit the voltage signal data or the current signal data to the central processing unit 1601 by using the high-speed serial bus 1604. In addition, an MCU is further integrated in the touch chip 1606, where the clock rate of the MCU is 200 MHz~400 MHZ, and the MCU may be configured to perform processing such as analog-to-digital conversion on signals.

The touch chip 1606 may transmit the voltage signal data or the current signal data to the central processing unit 1605 and the central processing unit 1601 by using the high-speed serial bus 1604.

The central processing unit 1605 or the central processing unit 1601 calculates position information of the trigger operation in the touchscreen based on the source data.

The foregoing combinations should also be included in the scope of a computer-readable medium. The foregoing descriptions are merely specific implementations of this application, but are not intended to limit the protection scope of this application. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A method for calculating position information in a touchscreen, wherein the method is applied to an electronic device, comprising:
sampling, by a touch chip, source data generated by a trigger operation in the touchscreen, when the touchscreen receives the trigger operation, wherein the sampling, by the touch chip, comprises transmitting, by the touch chip, a sampling pulse sequence to the touchscreen based on a preset sampling period, to obtain sampled analog data generated by the trigger operation;
converting, by a microcontroller unit (MCU) that is integral to the touch chip, the sampled analog data into a digital format which is the source data;
transmitting, by the touch chip, the source data to a system on chip (SOC) by using a high-speed serial bus, wherein the SOC comprises a central processing unit (CPU), a bus controller, and a direct memory access, and wherein transmitting of the source data by the touch chip to the CPU comprises at least copying, by the bus controller, the source data from the touch chip to the DMA by using the high-speed serial bus, and controlling, by the touch chip, the CPU to wake up a data transfer thread of the CPU, wherein a priority of instructing to wake up the data transfer thread preset in the CPU is higher than that of another to-be-processed thread in the CPU, and wherein the source data is used to indicate capacitance of the touch chip, wherein when the preset sampling period is greater than a sum of a first duration associated with a duration for the touch chip to transmit the source data to the CPU and a second duration associated with a duration for calculating the position information of the trigger operation in the touchscreen, transmission from the touch chip to the CPU of the source data that is sampled by an $N^{th}$ group of the sampling pulse sequence is performed with the high-speed serial bus simultaneously with transmission of an $(N+1)^{th}$ group of the sampling pulse sequence;
filtering, by the CPU with a higher clock rate than that of the MCU, the obtained source data in the digital format, by using a filtering algorithm, which reduces noise in the filtered source data;
calculating, by the CPU with the higher clock rate than that of the MCU, position information of the trigger operation in the touchscreen based on the filtered source data.

2. The method according to claim 1, wherein the sampling pulse sequence comprises a sampling voltage greater than a preset voltage threshold comprising 3V and wherein the transmitting, by the touch chip, the source data to the CPU by using a high-speed serial bus further comprises:
controlling, by the CPU, the bus controller to add a DMA flag, wherein the flag is used to indicate that the DMA is occupied by the bus controller, wherein the source data is copied from the touch chip to the DMA by the bus controller using the high speed serial bus after the DMA is occupied by the bus controller; and controlling, by the bus controller, the CPU to extract the source data from the DMA.

3. The method according to claim 2, wherein a priority of a thread preset in the bus controller and that is to occupy the DMA is higher than that of another to-be-processed thread in the bus controller.

4. The method according to claim 2, wherein after the controlling, by the CPU, the bus controller to add a DMA flag, the method further comprises:

controlling the data transfer thread to start sleeping; and the controlling, by the bus controller, the CPU to extract the source data from the DMA comprises: controlling, by the bus controller, the CPU to wake up the data transfer thread; and extracting the source data from the DMA after the CPU wakes up the data transfer thread.

5. The method according to claim 1, wherein N is an integer greater than 1, and the sampling period is less than a preset duration threshold.

6. The method according to claim 5, wherein the preset duration threshold is less than or equal to 2.5 ms.

7. The method according to claim 1, wherein the sampling, by the touch chip, source data generated by a trigger operation in the touchscreen comprises:

transmitting, by the touch chip, the sampling pulse sequence to the touchscreen based on the preset sampling period, to sample the source data generated by the trigger operation in the touchscreen; wherein a quantity of sampling pulses in the sampling pulse sequence is less than 30.

8. The method according to claim 7, wherein the sampling voltage of the sampling pulses is 6 V or 7 V.

9. The method according to claim 7, wherein the trigger operation comprises a touch and hold operation or a click operation.

10. The method according to claim 1, wherein the high-speed serial bus is a serial peripheral interface (SPI) bus.

11. The method according to claim 1, wherein after the calculating, by the CPU, position information of the trigger operation in the touchscreen based on the source data, the method further comprises:

transparently transmitting, by the CPU, the position information to a third-party application, so that the third-party application performs a function corresponding to a control at the position information.

12. An electronic device, comprising:

a touchscreen, a touch chip comprising a microcontroller unit (MCU) that is integral to the touch chip, and a system on chip comprising: a bus controller, a direct memory access DMA, and a central processing unit (CPU), wherein when the touchscreen receives a trigger operation, the electronic device performs operations comprising:

sampling, by the touch chip, source data generated by a trigger operation in the touchscreen, when the touchscreen receives the trigger operation, wherein the sampling, by the touch chip, comprises transmitting, by the touch chip, a sampling pulse sequence to the touchscreen based on a preset sampling period, to obtain sampled analog data that is generated by the trigger operation;

converting, by the MCU of the touch chip, the sampled analog data into a digital format which is the source data;

transmitting, by the touch chip, the source data to the CPU by using a high-speed serial bus, wherein the transmitting of the source data by the touch chip to the CPU comprises at least copying, by the bus controller, the source data from the touch chip to the DMA by using the high-speed serial bus, and controlling, by the touch chip, the CPU to wake up a data transfer thread of the CPU, wherein a priority of instructing to wake up the data transfer thread preset in the CPU is higher than that of another to-be-processed thread in the CPU, and wherein the source data is used to indicate capacitance of the touch chip, wherein when the preset sampling period is greater than a sum of a first duration associated with a duration for the touch chip to transmit the source data to the CPU and a second duration associated with a duration for calculating the position information of the trigger operation in the touchscreen, transmission from the touch chip to the CPU of the source data that is sampled by an $N^{th}$ group of the sampling pulse sequence is performed with the high-speed serial bus simultaneously with transmission of an $(N+1)^{th}$ group of the sampling pulse sequence;

filtering, by the CPU with a higher clock rate than that of the MCU, the obtained source data in the digital format, by using a filtering algorithm, which reduces noise in the filtered source data;

calculating, by the CPU with the higher clock rate than that of the MCU, position information of the trigger operation in the touchscreen based on the filtered source data.

13. The electronic device according to claim 12, wherein the transmitting, by the touch chip, the source data to the CPU by using a high-speed serial bus comprises:

controlling, by the CPU, the bus controller to add a DMA flag, wherein the flag is used to indicate that the DMA is occupied by the bus controller, wherein the source data is copied from the touch chip to the DMA by the bus controller using the high speed serial bus after the DMA is occupied by the bus controller; and controlling, by the bus controller, the CPU to extract the source data from the DMA.

14. The electronic device according to claim 13, wherein a priority of a thread preset in the bus controller and that is to occupy the DMA is higher than that of another to-be-processed thread in the bus controller.

15. The electronic device according to claim 13, wherein after controlling the bus controller to add a DMA flag, the method further comprises:

controlling the data transfer thread to start sleeping; and the controlling, by the bus controller, the CPU to extract the source data from the DMA comprises: controlling, by the bus controller, the CPU to wake up the data transfer thread; and extracting the source data from the DMA after the CPU wakes up the data transfer thread.

16. The electronic device according to claim 12, wherein N is an integer greater than 1, and the sampling period is less than a preset duration threshold.

17. The electronic device according to claim 16, wherein the preset duration threshold is less than or equal to 2.5 ms.

18. The electronic device according to claim 12, wherein the sampling, by the touch chip, source data generated by a trigger operation in the touchscreen comprises:

transmitting, by the touch chip, the sampling pulse sequence to the touchscreen based on the preset sampling period, to sample the source data generated by the trigger operation in the touchscreen; wherein a quantity of sampling pulses in the sampling pulse sequence is less than 30.

19. The electronic device according to claim 18, wherein the sampling voltage of the sampling pulses is 6 V or 7 V.

20. The electronic device according to claim 18, wherein the trigger operation comprises a touch and hold operation or a click operation.

* * * * *